US010414039B2

(12) United States Patent
Meeker et al.

(10) Patent No.: US 10,414,039 B2
(45) Date of Patent: Sep. 17, 2019

(54) REMOTELY CONTROLLED PACKABLE ROBOT

(71) Applicant: Foster-Miller, Inc., Waltham, MA (US)

(72) Inventors: David C. Meeker, Natick, MA (US); Timothy J. Mason, Uxbridge, MA (US); Andrew Kirouac, Chelmsford, MA (US); Ryan Wasserman, Medford, MA (US)

(73) Assignee: Foster-Miller, Inc., Waltham, MA (US)

( * ) Notice: Subject to any disclaimer, the term of this patent is extended or adjusted under 35 U.S.C. 154(b) by 121 days.

(21) Appl. No.: 15/704,223

(22) Filed: Sep. 14, 2017

(65) Prior Publication Data

US 2018/0079070 A1 Mar. 22, 2018

Related U.S. Application Data

(60) Provisional application No. 62/396,990, filed on Sep. 20, 2016.

(51) Int. Cl.
*B25J 5/00* (2006.01)
*B25J 9/00* (2006.01)
(Continued)

(52) U.S. Cl.
CPC ............ *B25J 5/005* (2013.01); *B25J 9/0009* (2013.01); *B25J 11/002* (2013.01); *B25J 13/006* (2013.01);
(Continued)

(58) Field of Classification Search
CPC ........ B25J 5/005; B25J 9/0009; B25J 11/002; B25J 13/006; B25J 18/02; B25J 19/023; B62D 55/075
See application file for complete search history.

(56) References Cited

U.S. PATENT DOCUMENTS

| 1,592,654 A | 7/1926 | Bremer |
| 3,215,219 A | 11/1965 | Forsyth et al. |

(Continued)

FOREIGN PATENT DOCUMENTS

| CN | 1861333 A | 11/2006 |
| CN | 2933748 Y | 8/2007 |

(Continued)

OTHER PUBLICATIONS

Written Opinion of the International Searching Authority for PCT Application No. PCT/US2018/040975 dated Sep. 18, 2018, five (5) pages.

(Continued)

*Primary Examiner* — Kevin Hurley
(74) *Attorney, Agent, or Firm* — Iandiorio Teska & Coleman, LLP

(57) ABSTRACT

A remotely controlled packable robot features a chassis with a top surface and a bottom surface, a pair of main tracks for maneuvering the chassis, and an open channel under the robot defined by the bottom surface of the chassis and the main tracks. A robot arm is foldable from a stored position in the open channel underneath the robot chassis to a deployed position extending upwards from the top surface of the chassis. A camera assembly may be foldable from a stowed position in the open channel underneath the robot chassis next to the robot arm to a deployed position extending upwards from the top surface of the chassis.

29 Claims, 28 Drawing Sheets

(51) Int. Cl.
*B25J 11/00* (2006.01)
*B25J 13/00* (2006.01)
*B25J 18/02* (2006.01)
*B25J 19/02* (2006.01)
*B62D 55/075* (2006.01)
*B62D 55/065* (2006.01)
*B62D 57/024* (2006.01)

(52) U.S. Cl.
CPC ............. *B25J 18/02* (2013.01); *B25J 19/023* (2013.01); *B62D 55/065* (2013.01); *B62D 55/075* (2013.01); *B62D 57/024* (2013.01); *G05D 2201/0209* (2013.01)

(56) References Cited

U.S. PATENT DOCUMENTS

| | | |
|---|---|---|
| 3,306,250 A | 2/1967 | Pitchford |
| 3,417,832 A | 12/1968 | Ziccardi |
| 3,869,011 A | 3/1975 | Jensen |
| 4,337,846 A | 7/1982 | Yonemoto et al. |
| 4,702,331 A | 10/1987 | Hagihara et al. |
| 4,709,773 A | 12/1987 | Clement et al. |
| 4,727,949 A | 3/1988 | Rea et al. |
| 4,932,491 A | 6/1990 | Collins, Jr. |
| 4,932,831 A | 6/1990 | White et al. |
| 4,977,971 A | 12/1990 | Crane, III et al. |
| 5,022,812 A * | 6/1991 | Coughlan ................ B25J 5/005 180/9.32 |
| 5,337,846 A | 8/1994 | Ogaki et al. |
| 6,263,989 B1 * | 7/2001 | Won ......................... B25J 5/005 180/8.7 |
| 6,431,296 B1 | 8/2002 | Won |
| 6,668,951 B2 | 12/2003 | Won |
| 7,348,747 B1 * | 3/2008 | Theobold ................ B25J 5/005 318/568.11 |
| 7,475,745 B1 | 1/2009 | DeRoos |
| 7,546,891 B2 | 6/2009 | Won |
| 7,556,108 B2 | 7/2009 | Won |
| 7,581,605 B2 | 9/2009 | Caspi et al. |
| 7,597,162 B2 * | 10/2009 | Won ......................... B25J 5/005 180/8.2 |
| 7,926,598 B2 | 4/2011 | Rudakevych |
| 8,074,752 B2 | 12/2011 | Rudakevych |
| 8,100,205 B2 | 1/2012 | Gettings et al. |
| 8,113,304 B2 | 2/2012 | Won |
| 8,122,982 B2 | 2/2012 | Morey et al. |
| 8,162,083 B2 | 4/2012 | Iwaki et al. |
| 8,176,808 B2 | 5/2012 | Fisk et al. |
| 8,201,649 B2 * | 6/2012 | Andrus ................ B62D 55/104 180/9.1 |
| 8,353,373 B2 * | 1/2013 | Rudakevych .......... B62D 55/06 180/9.1 |
| 8,365,848 B2 | 2/2013 | Won |
| 8,397,842 B2 | 3/2013 | Gettings |
| 8,573,335 B2 | 11/2013 | Rudakevych |
| 8,616,308 B2 | 12/2013 | Morey et al. |
| 8,644,991 B2 | 2/2014 | Ohm et al. |
| 8,763,732 B2 | 7/2014 | Won |
| 9,014,874 B2 | 4/2015 | Bruck et al. |
| 9,180,920 B2 * | 11/2015 | Rudakevych .......... B62D 55/06 |
| 9,193,066 B2 * | 11/2015 | Ohm ........................ B25J 5/005 |
| 9,211,648 B2 * | 12/2015 | Grinstead ............. B25J 19/023 |
| 9,216,781 B2 | 12/2015 | Ohm et al. |
| 9,227,654 B2 | 1/2016 | Wolf et al. |
| 9,248,874 B2 | 2/2016 | Won |
| 9,248,875 B2 | 2/2016 | Wolf et al. |
| 9,650,089 B2 * | 5/2017 | Ohm ........................ B25J 5/005 |
| 9,656,704 B2 * | 5/2017 | Couture ................... B25J 5/005 |
| 10,119,246 B2 * | 11/2018 | Sewell ................. B62D 11/001 |
| 2002/0062999 A1 * | 5/2002 | De-Noor ................ B62D 51/007 180/9.21 |
| 2004/0155554 A1 * | 8/2004 | Morgante ............... H02K 16/02 310/266 |
| 2004/0168837 A1 * | 9/2004 | Michaud ................ B25J 5/005 180/9.46 |
| 2004/0216931 A1 | 11/2004 | Won |
| 2004/0216932 A1 | 11/2004 | Giovanetti et al. |
| 2007/0209844 A1 | 9/2007 | Kamimura |
| 2008/0083344 A1 * | 4/2008 | Deguire .................. F41H 7/005 102/262 |
| 2008/0093131 A1 * | 4/2008 | Couture ................... B25J 5/005 180/9.1 |
| 2008/0121097 A1 * | 5/2008 | Rudakevych ........... F41A 19/58 89/28.05 |
| 2008/0179115 A1 | 7/2008 | Ohm et al. |
| 2008/0196946 A1 * | 8/2008 | Filippov ................. B25J 5/005 180/9.1 |
| 2009/0071281 A1 * | 3/2009 | Fisk ........................ B25J 5/005 74/490.03 |
| 2009/0229894 A1 * | 9/2009 | Roucka .............. B62D 49/0678 180/9.48 |
| 2009/0266628 A1 * | 10/2009 | Schempf ................. B62D 55/04 180/9.1 |
| 2010/0068024 A1 * | 3/2010 | Agens ........................ B66C 3/18 414/729 |
| 2010/0139995 A1 * | 6/2010 | Rudakevych .......... B62D 55/06 180/9.32 |
| 2010/0263524 A1 * | 10/2010 | Morin ..................... F41A 23/34 89/27.12 |
| 2010/0267311 A1 * | 10/2010 | Zimet .................... A63H 17/02 446/470 |
| 2011/0040427 A1 | 2/2011 | Ben-Tzvi |
| 2011/0106339 A1 | 5/2011 | Phillips et al. |
| 2011/0168460 A1 | 7/2011 | Goldenberg et al. |
| 2011/0190933 A1 * | 8/2011 | Shein ................... B62D 55/075 700/258 |
| 2012/0199407 A1 | 8/2012 | Morey et al. |
| 2012/0200149 A1 | 8/2012 | Rudakevych et al. |
| 2012/0215358 A1 | 8/2012 | Gettings et al. |
| 2012/0261204 A1 * | 10/2012 | Won ......................... B25J 5/005 180/167 |
| 2013/0078888 A1 * | 3/2013 | Mayer .................... A63H 33/003 446/433 |
| 2013/0152724 A1 | 6/2013 | Mozeika et al. |
| 2013/0268118 A1 | 10/2013 | Grinstead et al. |
| 2013/0340560 A1 | 12/2013 | Burridge et al. |
| 2014/0031977 A1 * | 1/2014 | Goldenberg ............... B25J 9/08 700/245 |
| 2014/0065586 A1 * | 3/2014 | Gabbai .................. G09B 19/0038 434/247 |
| 2014/0110183 A1 * | 4/2014 | Rudakevych .......... B60K 7/0007 180/9.32 |
| 2014/0166377 A1 * | 6/2014 | Terrien .................... B25J 5/005 180/9.32 |
| 2014/0231156 A1 | 8/2014 | Rudakevych |
| 2014/0277718 A1 * | 9/2014 | Izhikevich ................ B25J 9/163 700/250 |
| 2016/0176452 A1 * | 6/2016 | Gettings ............. B62D 55/0885 180/167 |
| 2018/0079073 A1 * | 3/2018 | Meeker .................... B25J 5/005 |
| 2018/0104815 A1 * | 4/2018 | Yang ......................... B25J 9/08 |
| 2018/0236666 A1 * | 8/2018 | Mozeika ................ B25J 9/1689 |
| 2018/0313715 A1 * | 11/2018 | Cichosz ................. B60B 19/003 |
| 2019/0009845 A1 * | 1/2019 | Nichol .................. B62D 55/084 |

FOREIGN PATENT DOCUMENTS

| | | |
|---|---|---|
| EP | 0 197 020 A1 | 10/1986 |
| WO | 2018/027219 A1 | 2/2018 |

OTHER PUBLICATIONS

Rajabi et al., "Prediction of Obstacle Climbing Capability for Tracked Vehicles", Proceedings of the 2011 IEEE International Symposium on Safety, Security and Rescue Robotics, Kyoto, Japan, Nov. 1-5, 2011, pp. 128-133.

Mohebbi et al., "Design, Simulation and Manufacturing of a Tracked Surveillance Unmanned Ground Vehicle", Proceedings of the 2010

(56) References Cited

OTHER PUBLICATIONS

IEEE International Conference on Robotics and Biomimetrics, Dec. 14-18, 2010, Tianjin, China, pp. 1268-1275.

SuperDroid Robots, Robots, Parts, and Custom Solutions, Internet Archive WaybackMachine, May 11, 2016, https://web.archive.org/web/20081114172239/http://www.superdroidrobots.com/shop/item.asp?itemid=864, pp. 1-5.

Lewis et al., "Chaos an Intelligent Ultra-Mobile SUGV: Combining the Mobility of Wheels, Tracks, and Legs", Proceedings of SPIE—The International Society for Optical Engineering May 2005, twelve (12) pages.

Cyberneticzoo.com, 1985-ACEC Mobile inspection Vehicle (Belgian), http://cyberneticzoo.com/teleoperators/1985-acec-mobile-inspection-vehicle-french/, pp. 1/12-10/12, May 23, 2016.

Cyberneticzoo.com, 1976-MF3 Manipulator Vehicle-Kohler (German), http://cyberneticzoo.com/teleoperators/1976-mf3manipulator-vehicle-kohler-german/, pp. 1/19-17/19, May 23, 2016.

Written Opinion of the international Searching Authority for PCT Application No. PCT/US17/51986 dated Jan. 18, 2018, six (6) pages.

Written Opinion of the International Searching Authority for PCT Application No. PCT/US17/52157 dated Nov. 27, 2017, four (4) pages.

Written Opinion of the International Searching Authority for PCT Application No. PCT/US2017/045736 dated Oct. 31, 2017, nine (9) pages.

International Search Report for PCT/US2017/045736 dated Oct. 31, 2017 (three (3) pages).

\* cited by examiner

Stowed

US 10,414,039 B2

REMOTELY CONTROLLED PACKABLE ROBOT

RELATED APPLICATIONS

This application claims benefit of and priority to U.S. Provisional Application Ser. No. 62/396,990 filed Sep. 20, 2016, under 35 U.S.C. §§ 119, 120, 363, 365, and 37 C.F.R. § 1.55 and § 1.78, which is incorporated herein by this reference.

FIELD OF THE INVENTION

This subject invention relates to remotely controlled maneuverable ground robots.

BACKGROUND OF THE INVENTION

Several existing ground robots are fairly maneuverable but are fairly heavy and too large to fit in a soldiers backpack. See, for example, U.S. Pat. Nos. 8,201,649; 5,022,812 and 7,597,162 incorporated herein by this reference. Other robots are smaller in weight and can be placed in a backpack but are not maneuverable enough, for example, to climb stairs. See U.S. Pat. No. 9,180,920 and published U.S. Patent Application No. 2009/0266628 incorporated herein by this reference.

BRIEF SUMMARY OF THE INVENTION

Featured is a lightweight, compact, man packable robot which in one example is highly mobile, unmanned, and can include advanced sensors and mission modules for dismounted forces. In one example, the ground robot is particularly useful for clearing buildings, caves, and other restricted terrain where close quarters combat is likely.

Featured is a remotely controlled packable robot comprising a chassis with a top surface and a bottom surface. A pair of main tracks are for maneuvering the chassis. There is an open channel under the robot defined by the bottom surface of the chassis and the main tracks. A robot arm is foldable from a stored position in the open channel underneath the robot chassis to a deployed position extending upwards from the top surface of the chassis. A camera assembly is also foldable from a stowed position in the open channel underneath the robot chassis next to the robot arm to a deployed position extending upwards from the top surface of the chassis. A skid plate may be provided for each main track.

In one example, a foldable base member for the robot arm is located on one end of the chassis and a foldable base member for the camera assembly is located on an opposite end of the chassis.

Also featured is a remotely controlled packable robot comprising a chassis, right and left main tracks for maneuvering the chassis, and right and left rearward tracked rotatable flipper arms for maneuvering the chassis. An integrated concentric drive assembly for each main track and flipper pair rotates a flipper, drives a main track, and drives the flipper track. A motor in a housing rotates the flipper. The right and left flippers arms can be independently driven. A stator and rotor disposed about the housing drives the main track and the flipper track. The housing is coupled to the chassis.

In one example, a slip clutch is attached to the flipper arm and is driven by the motor via a gear train. The stator may be affixed about the housing and preferably includes teeth with windings thereabout. The rotor preferably rotates about the housing and includes magnets therein. The rotor may include exterior teeth driving the main track. A sprocket may be attached to the rotor to drive the flipper track.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
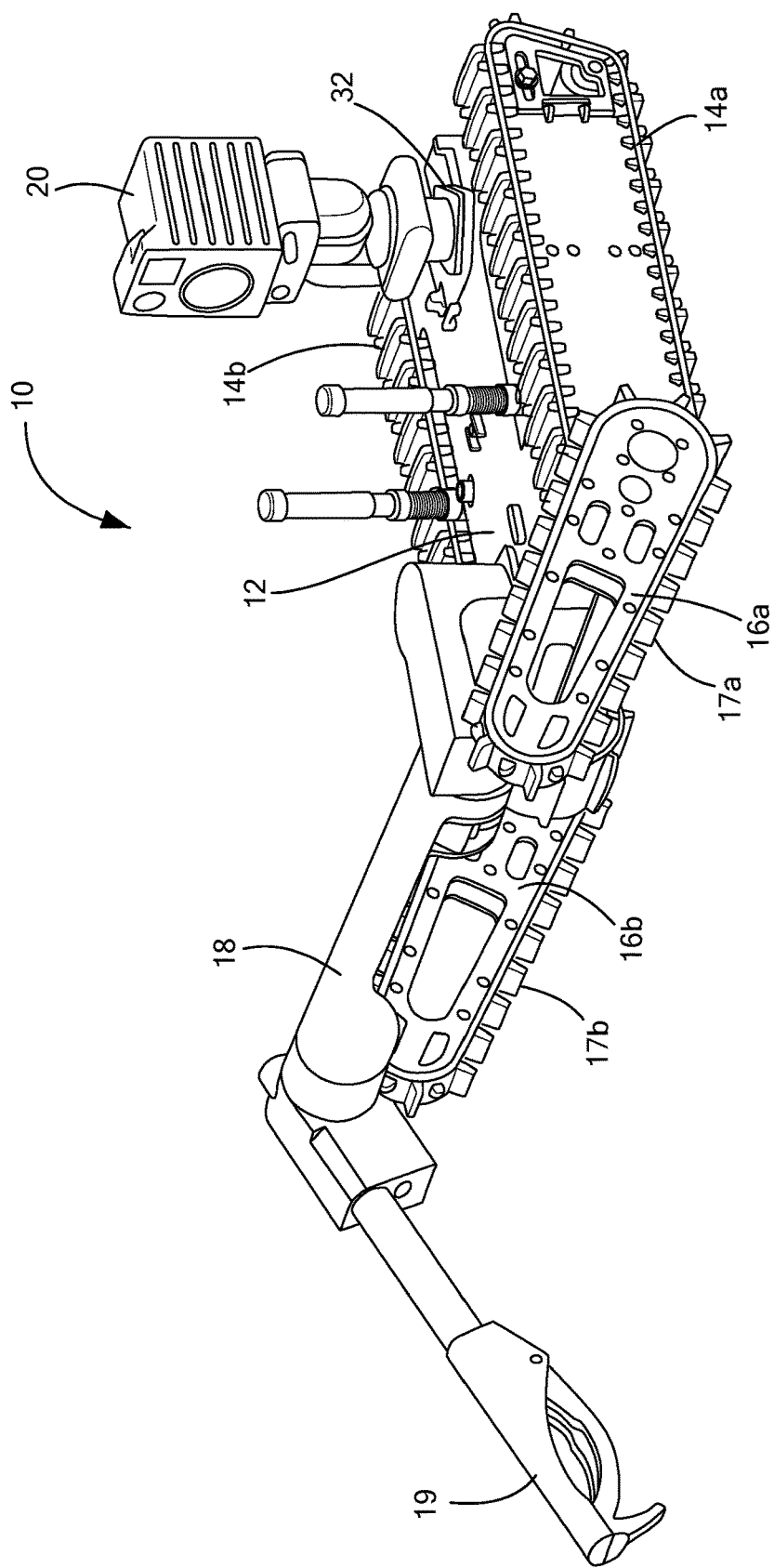
FIG. 1 is schematic view of an example of a remotely controlled packable ground robot in accordance with an example of the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of a remotely controlled packable robot 10 including a chassis 12. Right 14a and left 14b main tracks maneuver the chassis as do optional right 16a and left 16b rearward rotatable tracked flipper arms. Robot arm 18 with end effector 19 and/or camera assembly 20 may also be included.

Figure 2:
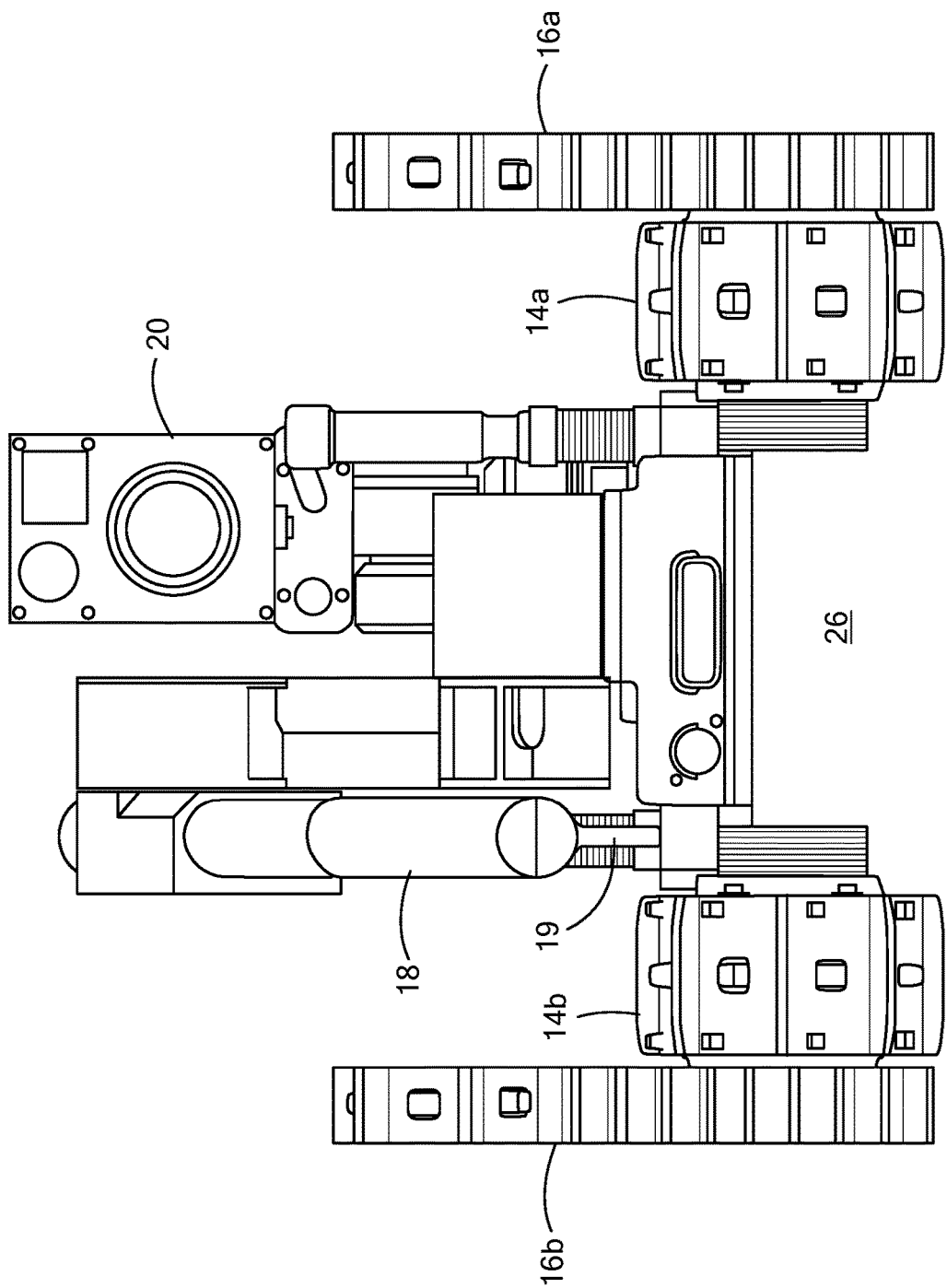
FIG. 2 is a schematic rear view of the robot shown in FIG. 1.

As shown in FIG. 2, chassis 12 is thin and plate-like in construction and includes top surface 22 and bottom surface 24 disposed high (e.g., three inches) above the ground for clearance over obstacles.

Figure 3:
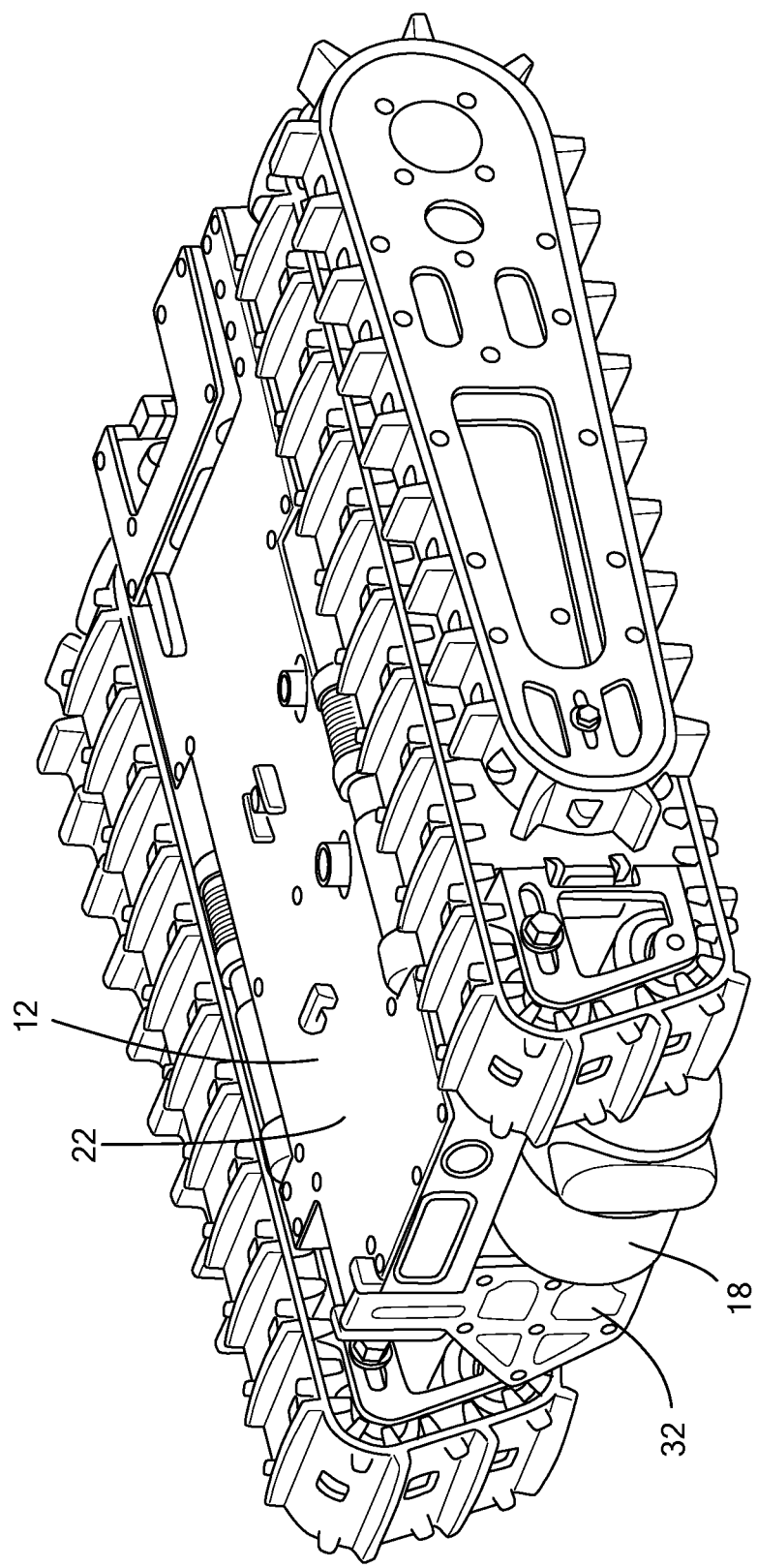
FIG. 3 is a schematic view showing the robot with its arm and camera assembly in their stowed position.

In this way, an open channel 26 under the robot is defined by the bottom surface 24 of the chassis 12 and between the main tracks 14a and 14b. For transport in a backpack by a dismounted soldier or user, both the robot arm 18 and the camera assembly 20 are folded underneath the robot chassis and reside almost completely in channel 26 as shown in FIG. 3.

Figure 4:
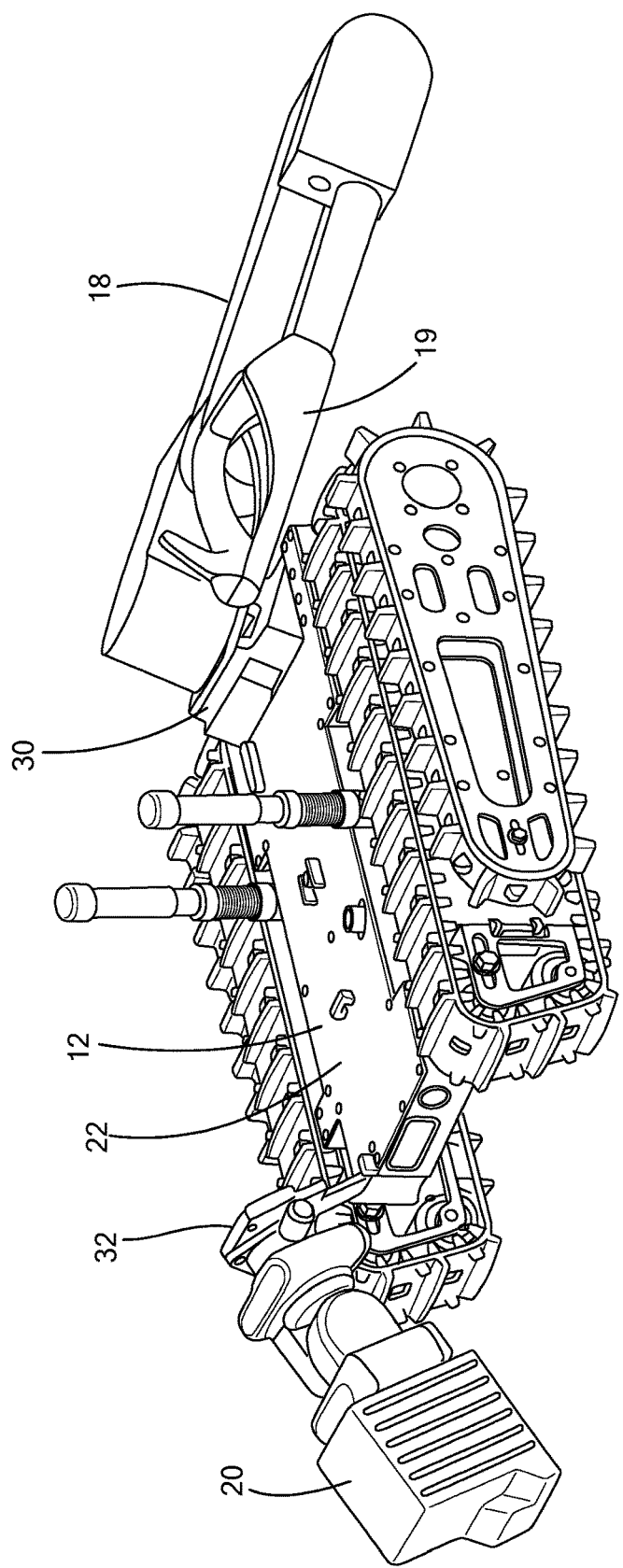
FIG. 4 is a schematic view of the robot showing the camera assembly and the robot arm being deployed.
Figure 5:
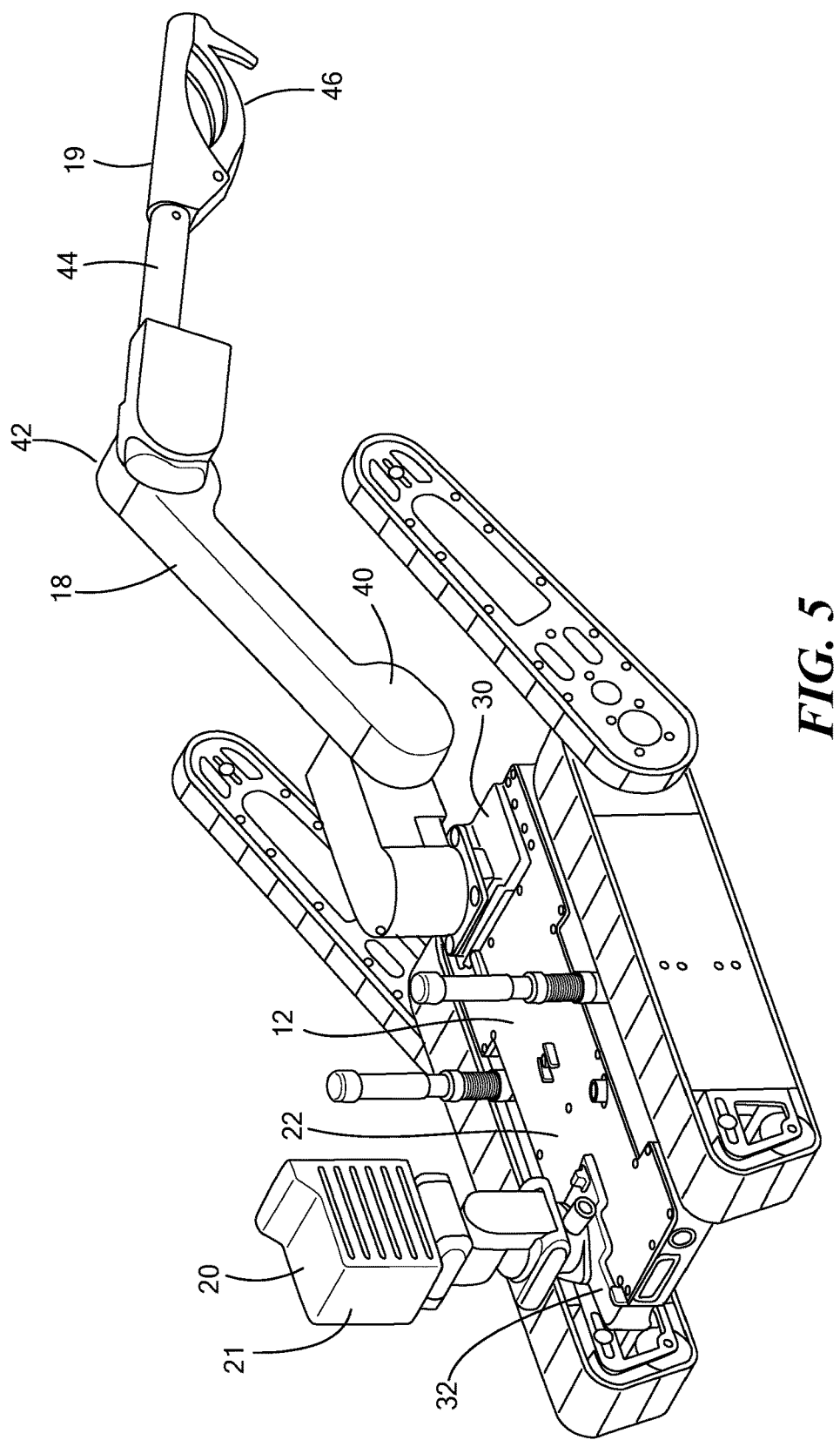
FIG. 5 is a schematic view showing the robot with the camera assembly and robot arm fully deployed.
Figure 6:
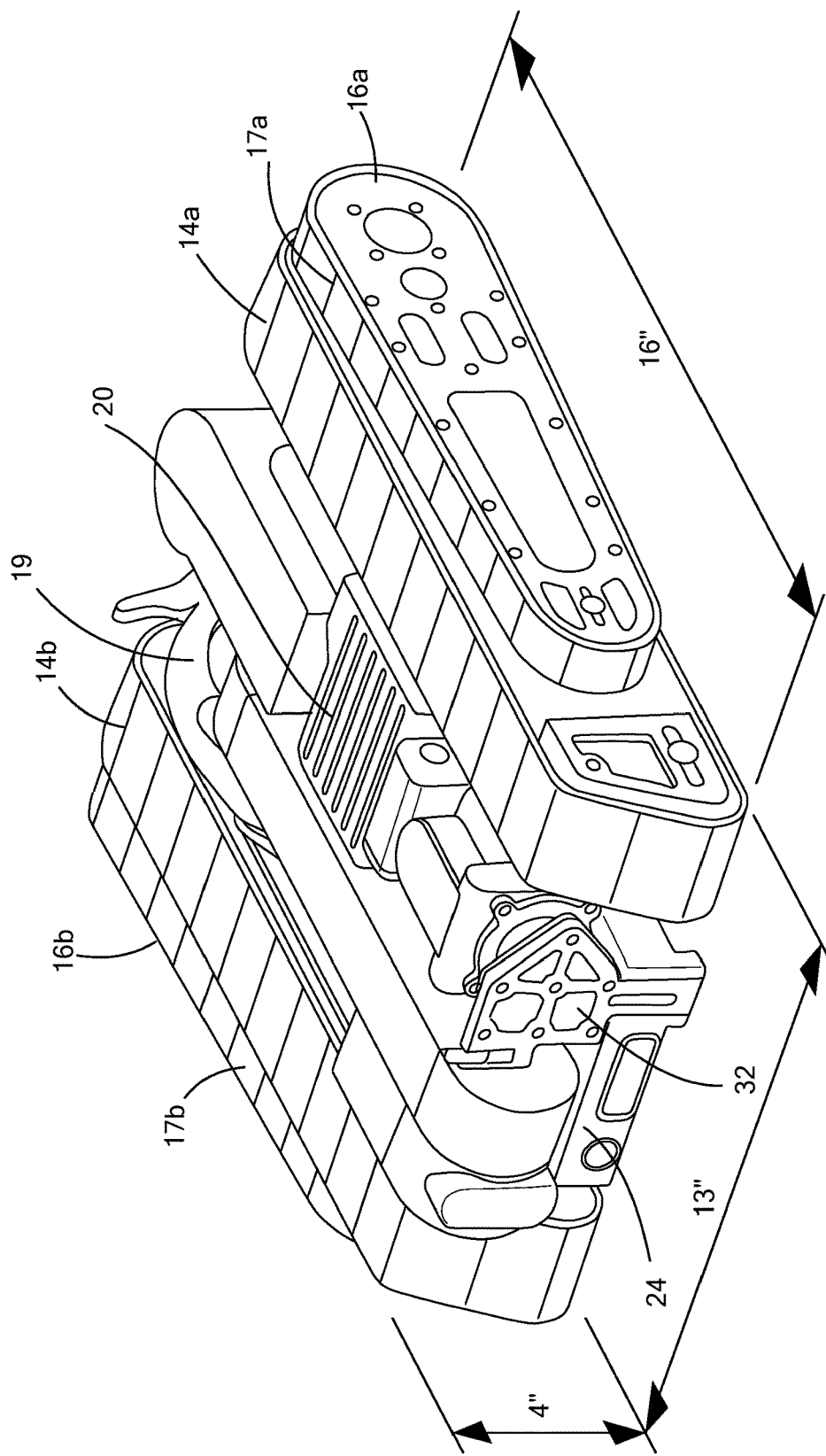
FIG. 6 is a another schematic view showing an example of the robot inverted with the camera assembly and robot arm in their stowed position in the underside of the robot.

In one preferred design, robot arm 18 is mounted onto the top of foldable base plate member 30, FIG. 4 rotatably coupled to the rear end of the chassis. In FIG. 5, the bottom of base plate member 30 is on the top of the chassis and the base plate member can be releasably secured to the top 22 of chassis 12 using, for example, a latch on chassis 12. Arm 18 is now in the deployed position extending upwards from the top surface of the chassis. In FIGS. 3 and 6, the arm base member 30 is folded relative to the chassis to a position depending downward from the chassis and the arm is stowed in the open channel under the robot next to the camera assembly.

Foldable base member plate 32 for the camera assembly 20 is rotatably coupled to the forward end of the chassis. The camera assembly 20 is coupled onto the top of this base member 32 and thus can be stowed as shown in FIGS. 3 and 6 in the open channel underneath the robot adjacent the robot arm and then deployed as shown in FIGS. 4 and 5 so camera assembly 20 extends upward from the top surface of the chassis. In FIG. 5, a latch can be used to releasably lock the bottom of camera assembly base member 32 into engagement with the top of the chassis. The robot arm and camera assembly can be manually stowed, deployed, and latched. Preferably, the base member plates 30, 32 rotate from a position where they lie on the top surface of the chassis to a position where they depend downward from an edge of the chassis (e.g., at a right angle to the plane of the chassis).

Figure 7:
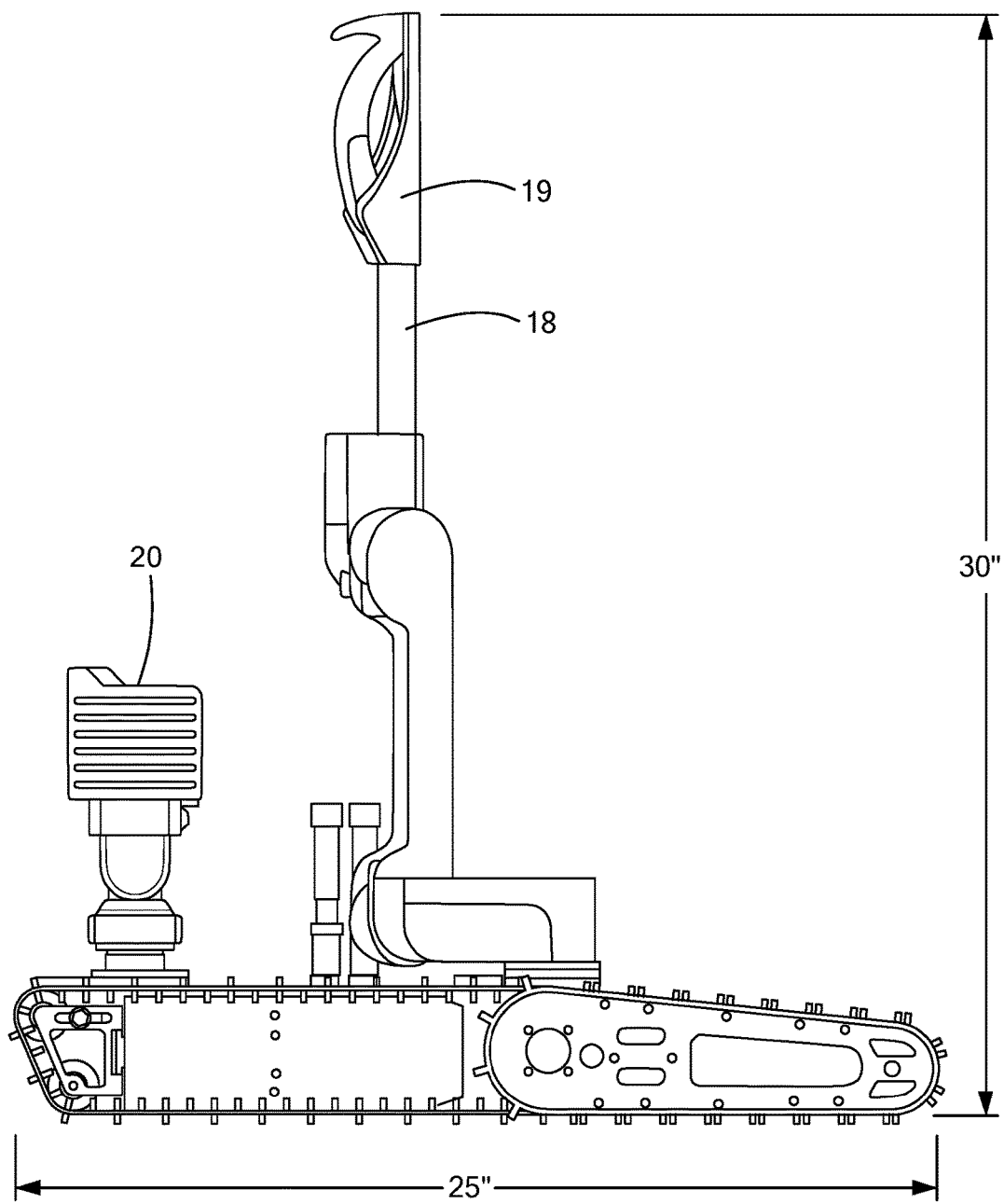
FIG. 7 is another schematic view showing the robot with the camera assembly and the robot arm deployed.

Preferably, the robot is approximately 4 inches tall and 13 inches wide and 16 long with the arm and camera assembly in the stowed position and with the flipper arms also stowed as shown in FIG. 6. In the deployed position shown in FIG. 7, the arm extends approximately 30 inches and the flippers when extended make the robot approximately 25 inches long enabling maneuverability over obstacles and, for example, up and down stairs.

Motors in the robot arm 18, FIG. 5 rotate shoulder 40 and elbow 42, rotate wrist 44 and open and close end effector 19 jaw 46. See also U.S. Pat. No. 8,176,808 incorporated herein by this reference. Camera assembly 20 may include motors to rotate and tilt the camera head 21 relative to base member 32. Camera head 20 may include a zoomable color camera as well as other imaging technology (e.g., infrared cameras, and the like).

Figure 8:
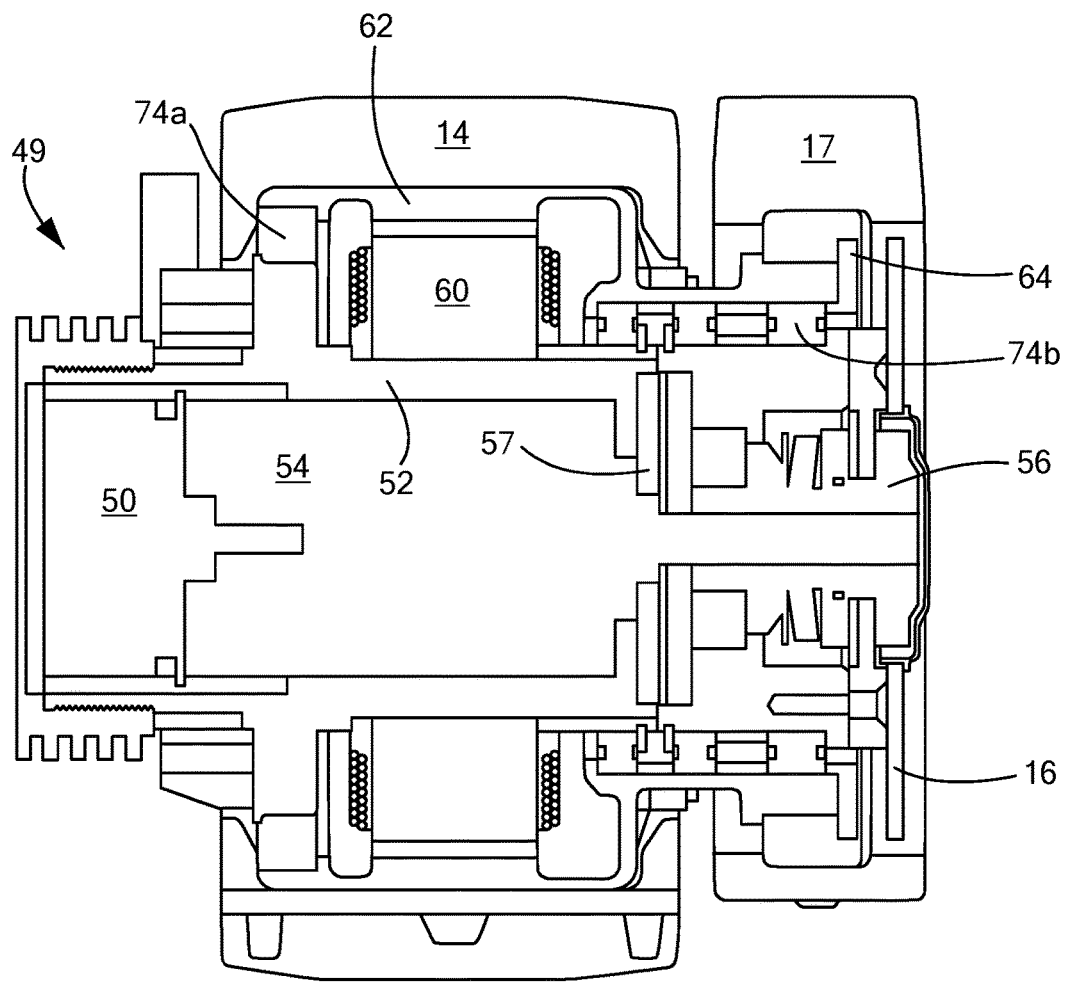
FIG. 8 is a schematic cross sectional view showing and example of a compact motor assembly in accordance with aspects of the invention.
Figure 9:
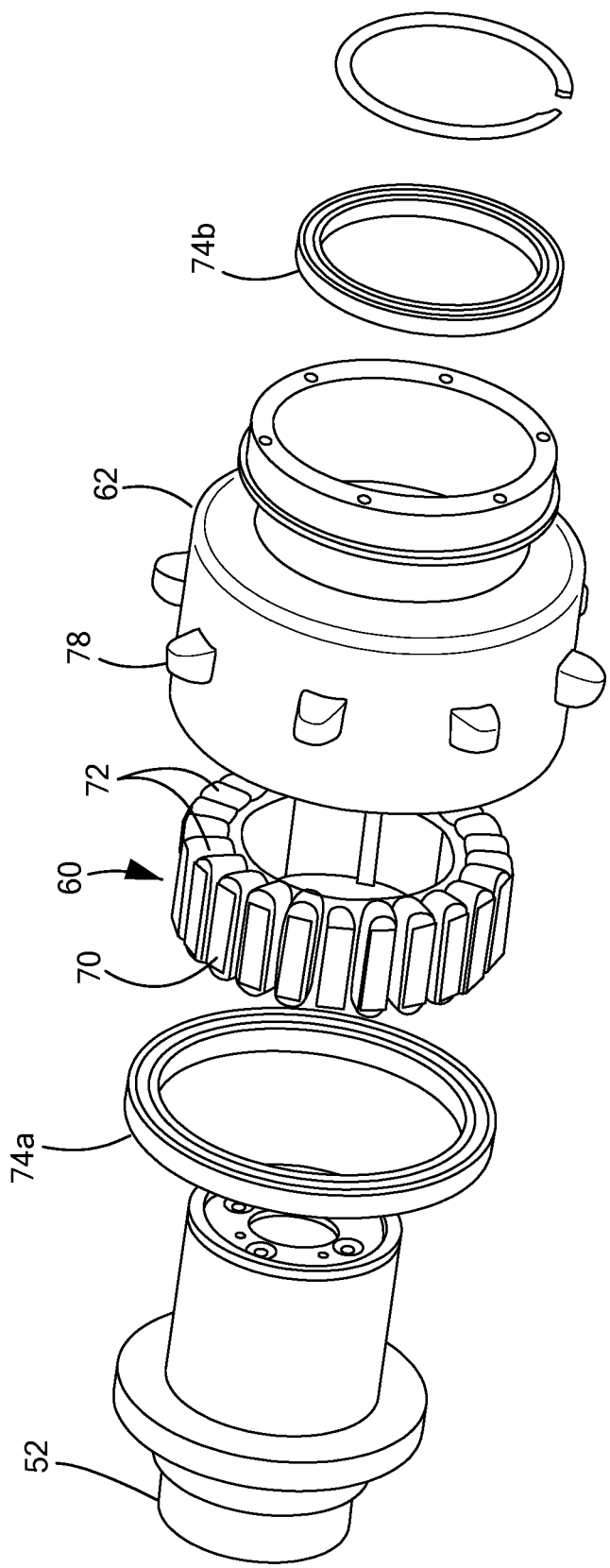
FIG. 9 is an exploded view of the drive motor.
Figure 10:
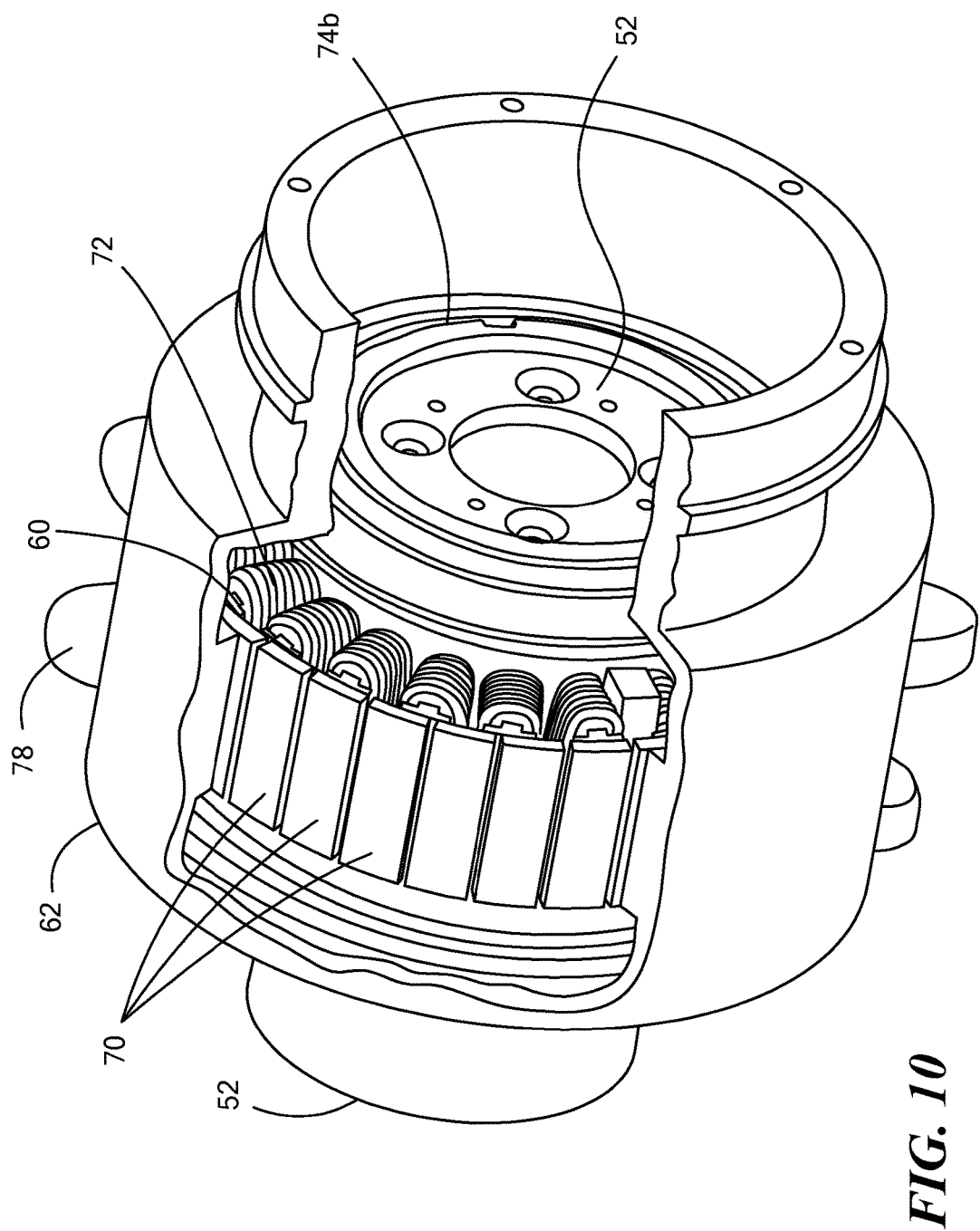
FIG. 10 is another view of the motor.

Preferably, when the flippers are incorporated, so too is an integrated concentric drive assembly 49 for each main track and flipper pair as shown in FIGS. 8-10. One such assembly, for example, would be mounted to the chassis to drive right track 14a, rotate right rear flipper 16a, and drive its track 17a. Another such assembly would be mounted to the chassis and used to drive left track 14b, rotate left rear flipper 16b and drive its track 17b.

Preferably electric motor 50 is disposed inside motor housing 52 (coupled to the chassis) and rotates a flipper arm 16 via planetary gear box 54 and slip clutch 56 which is fixed to flipper arm 16. Slip clutch 56 prevents damage to the flipper arm if the robot is dropped. Encoder 57 enables the absolute location of the flipper arm to be known. Stator 60 and rotor 62 are disposed about motor housing 52 for driving a main track 14 and the flipper track 17 via sprocket 64. Stator 60 and rotor 62 are concentric with motor 50 housing 52. In one design, stator ring 60 is a fixed about the housing 52 and includes teeth 70 each with a winding 72 thereabout. Rotor ring 62 can rotate about motor housing 52 via bearings 74a and 74b. Rotor 62 includes therein, inside the ring can, permanent magnets 80. Battery power is used to energize motor 50 and windings 72.

A main track 14 is disposed about rotor 62. Sprocket 64 has a flipper track 17 disposed about it. Sprocket 64 is coupled to rotor 62. In this way, rotation of the rotor rotates both a flipper track and a main track. Rotor 62 may include exterior teeth 78 for driving a main track.

Figure 11:
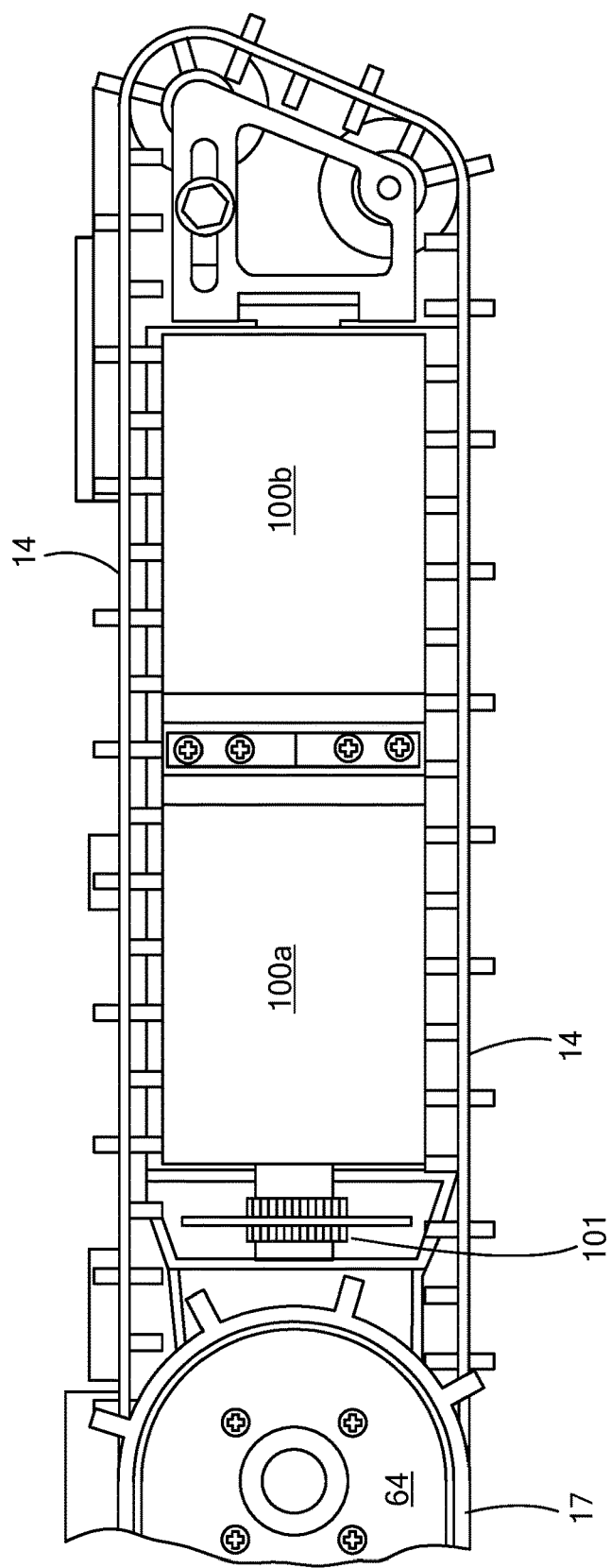
FIG. 11 is a schematic view showing an example of robot track side pods.

FIG. 11 shows two batteries 100a and 100b in a side pod disposed within a main track 14. Electronic speed controllers 101 can also be located in the side pod. This battery location provides a lower center of gravity for the robot and the batteries are hot swappable through a hinged door. Alternatively, a battery cage assembly slides into the sidepod. A track tensioning mechanism 102 is also shown.

Figure 12:
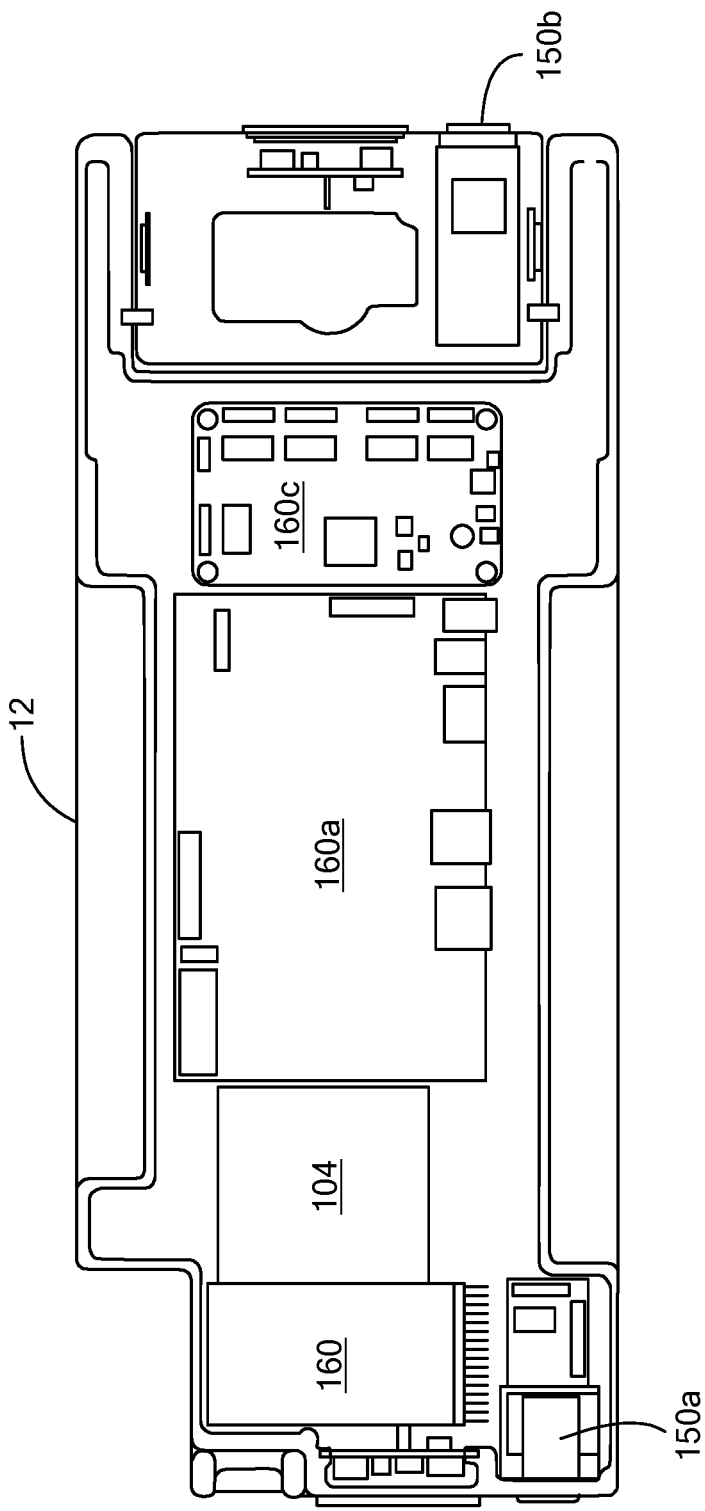
FIG. 12 is a schematic top view showing an example of the chassis component layout.

FIG. 12 shows an example of a chassis component layout including a radio 104 for remotely communicating with the robot and for transmitting video signals back to an operator control unit from the camera assembly. Various other cameras 150, printed circuit boards, and processor and controller boards 160a-160c are also shown. Pixhawk (real-time controller with integrated inertial measurement unit), Ethernet switch, and measurement unit), Ethernet switch, and Nitrogen (embedded Linux board) boards may be used. An example of an operator control unit is shown in U.S. Pat. No. 9,014,874 incorporated herein by this reference. In some embodiments, an operator control unit may include a hardened military style tablet device.

Figure 13:
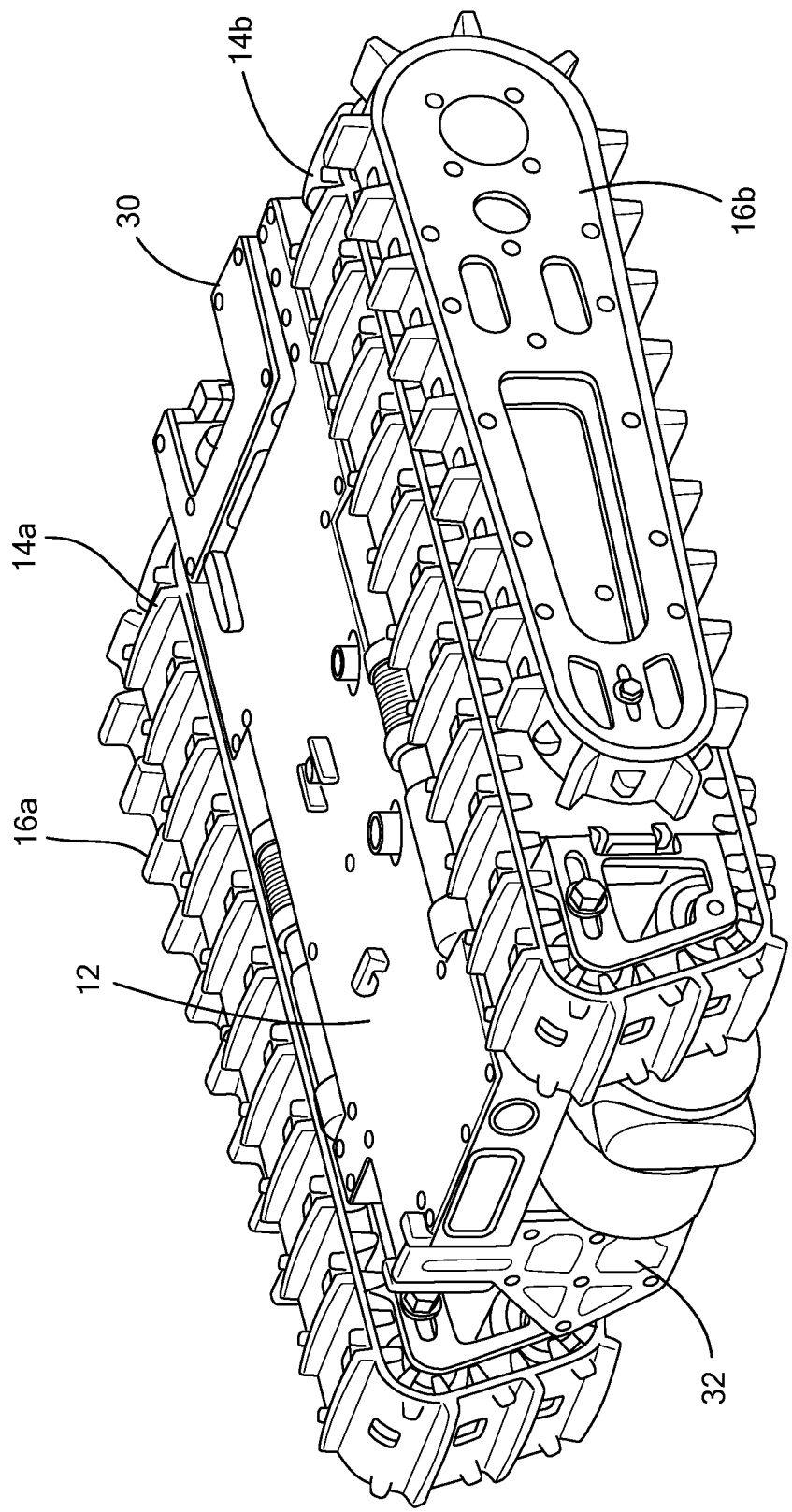
FIGS. 13-16 are schematic views showing various configuration options for a robot in accordance with examples of the invention.
Figure 14:
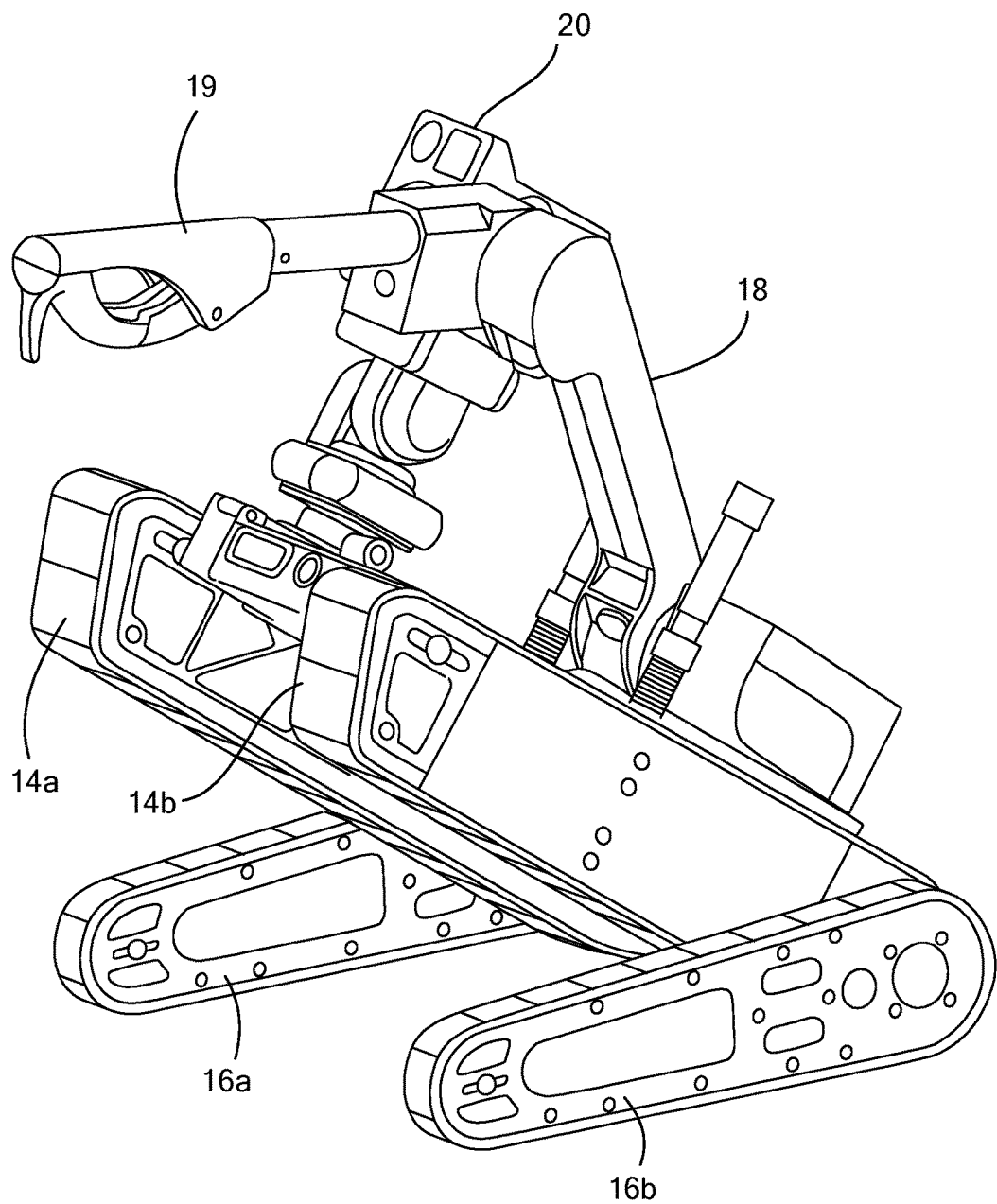
Figure 15:
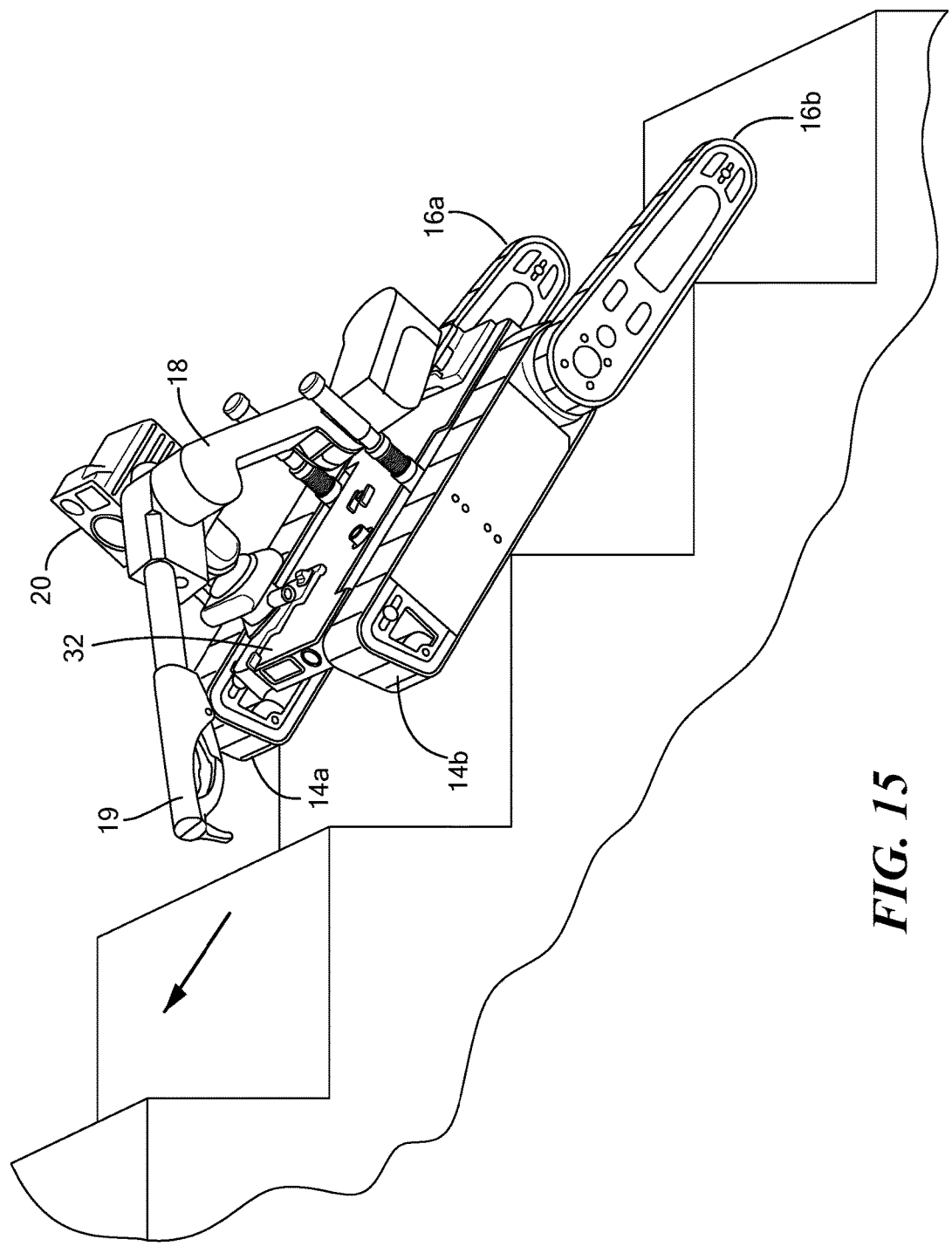
Figure 16:
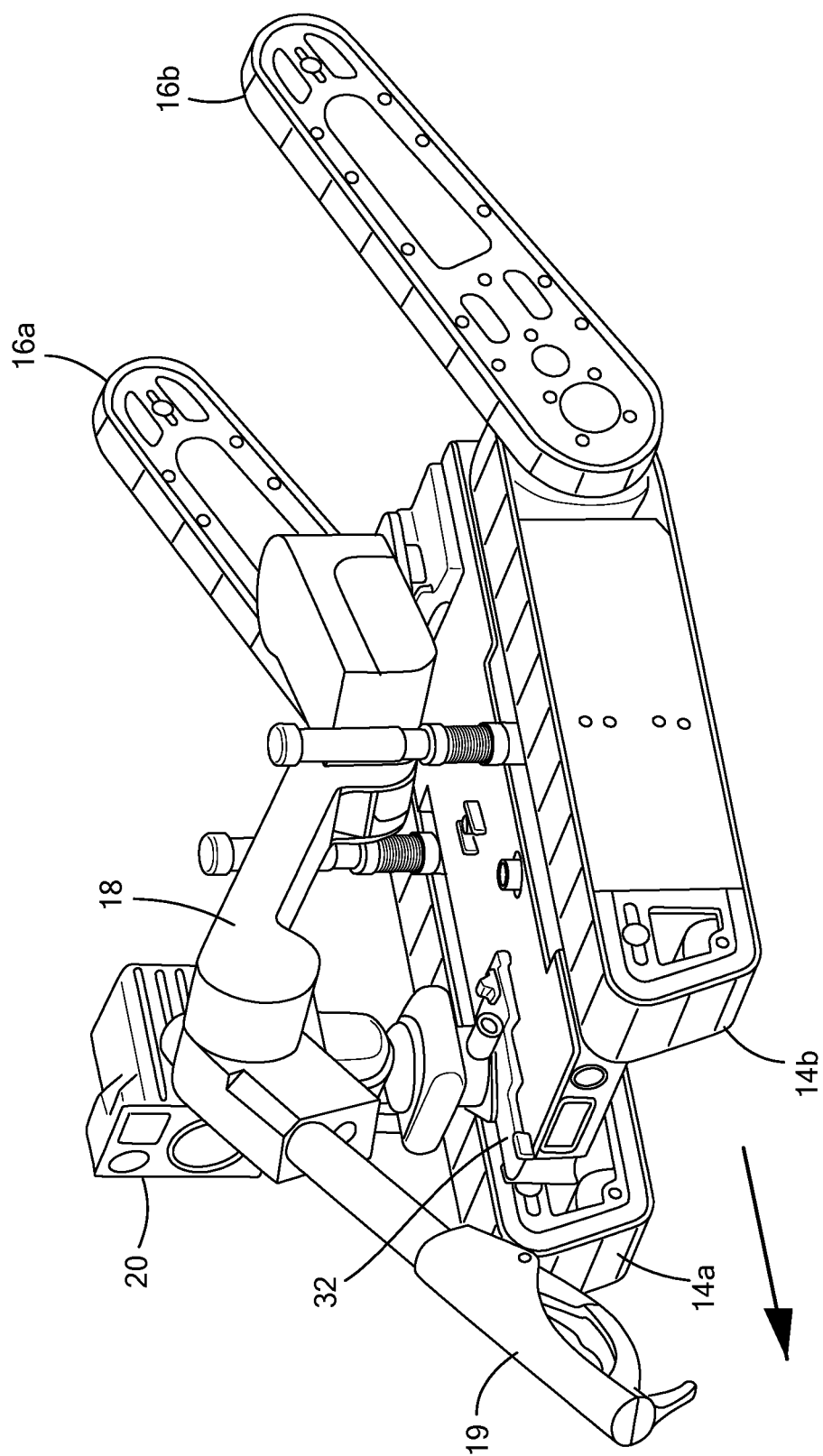
Figure 17:
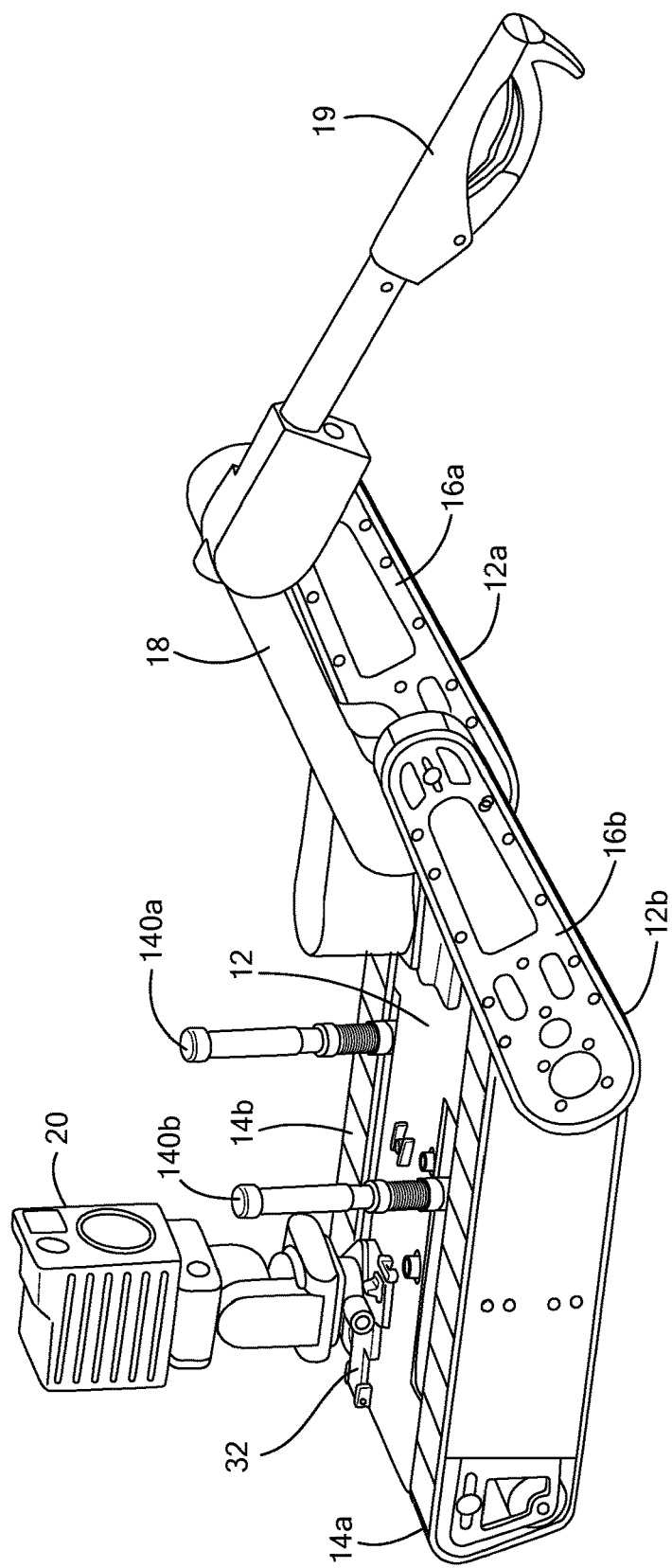
FIGS. 17-29 are views of another embodiment of one example of the robot.
Figure 18:
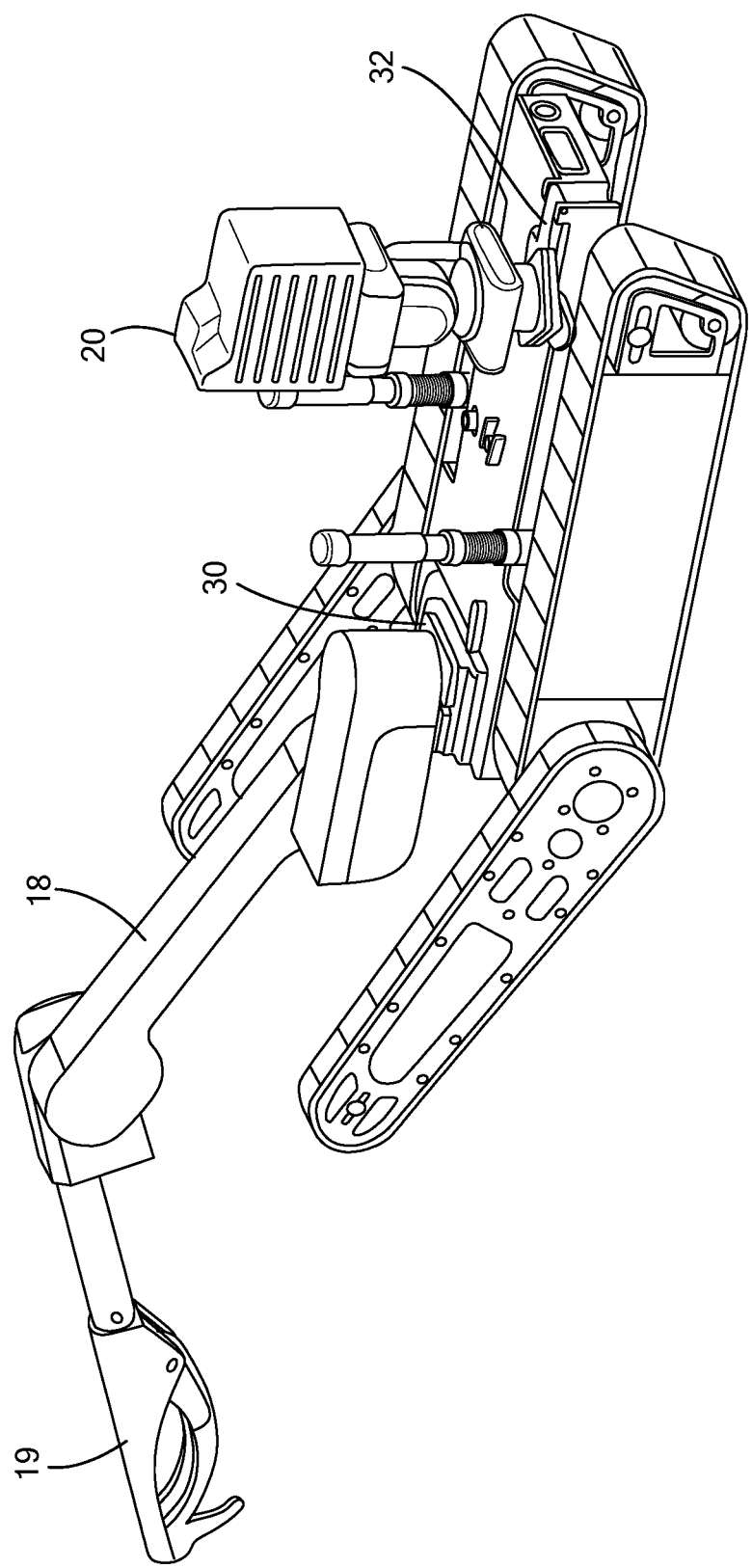

FIGS. 13-16 show various configuration options for the robot. In FIG. 13, the camera and arm are stowed underneath the robot chassis and the flippers 16a, 16b are rotated to be adjacent main tracks 14a, 14b for storage and transport of the robot. In FIG. 14, the camera assembly 20 and robot arm 18 are deployed and the flippers 14a, 14b are rotated into position to lift the forward end of the robot to initiate stair climbing or to surmount a large obstacle. FIG. 15 shows the flippers 16a, 16b rotated straight behind the robot for stabilizing the robot during climbing stairs. FIG. 16 shows the position of the flipper arms for normal operation.

Preferably, the weight of the combined system is less than 32 pounds with the operator control unit weighting less than 5 pounds. In the folded configuration, the robot fits in a tactical or assault backpack (MOLLE brand or others) which is approximately 16 inches high, 13 inches wide, and 4 inches thick. In one example, the MOLLE Assault Pack II NSN number is: 8465-01-580-0981. The robot can climb and descend 8.5 inch by 10 inch stairs, is self righting, and has a very low center of gravity. At the same time, the robot has a fairly high ground clearance.

In one example, motor 50 is an EC 32 Flat (339268) motor and 531:1 and gear box 54 is a 531:1 32C Planetary Gear Head available from Maxon Precision Motors, Inc. The chassis and side pods may be made of aluminum, the tracks can be made of polyurethane, and the flippers may be made of carbon fiber. The arm may be 4 pounds total weight, have a maximum reach of 26 inches and 5 pound lift capability at full extension. Preferably, non-back drivable gear boxes with slip clutches are used in the arm. The chassis may include cameras on the front, rear, and/or sides, for example, video and/or thermal cameras. The camera assembly may be equipped with a video camera, have a 360° continuous pan range, clockwise and counter clockwise rotation and a tilt range of −45° to +90°. Illumination sources, thermal cameras, and the like can also be equipped with the camera assembly.

FIGS. 17-27 show another embodiment of the robot where the base member 32 for the camera assembly includes a rotatable arm to which the camera assembly is attached. In this embodiment, the chassis also includes a U-shaped cut-out at the rear end thereof defining two spaced arms. The base member plate for the robot arm is located in the cut-out and is hinged between the two chassis arms and flips upside down relative to the chassis to store the arm underneath the robot. FIGS. 17-27 also show various latch mechanisms for retaining the robot arm and the camera assembly in their deployed positions on the top of the chassis.

Figure 19:
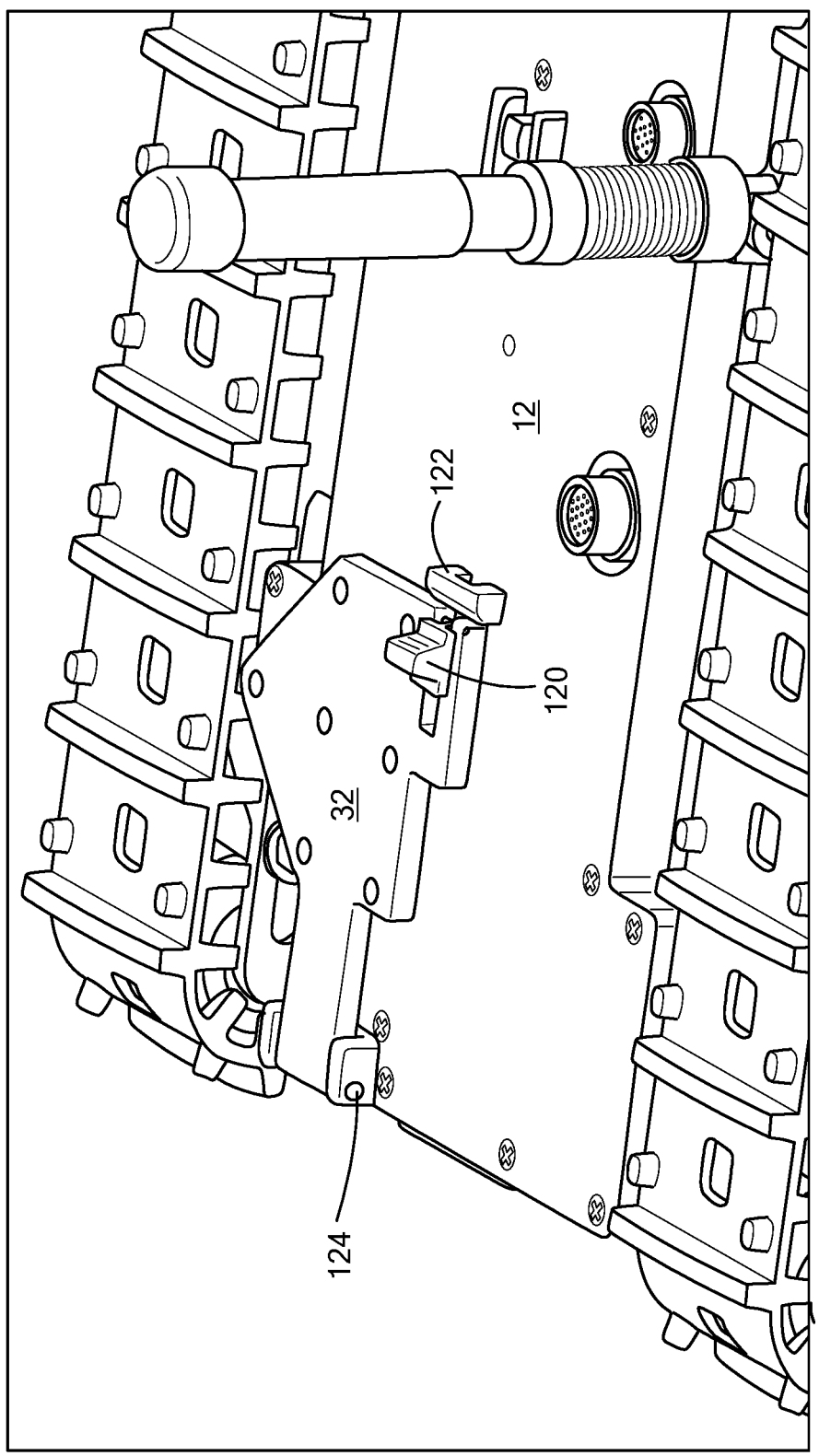
Figure 20:
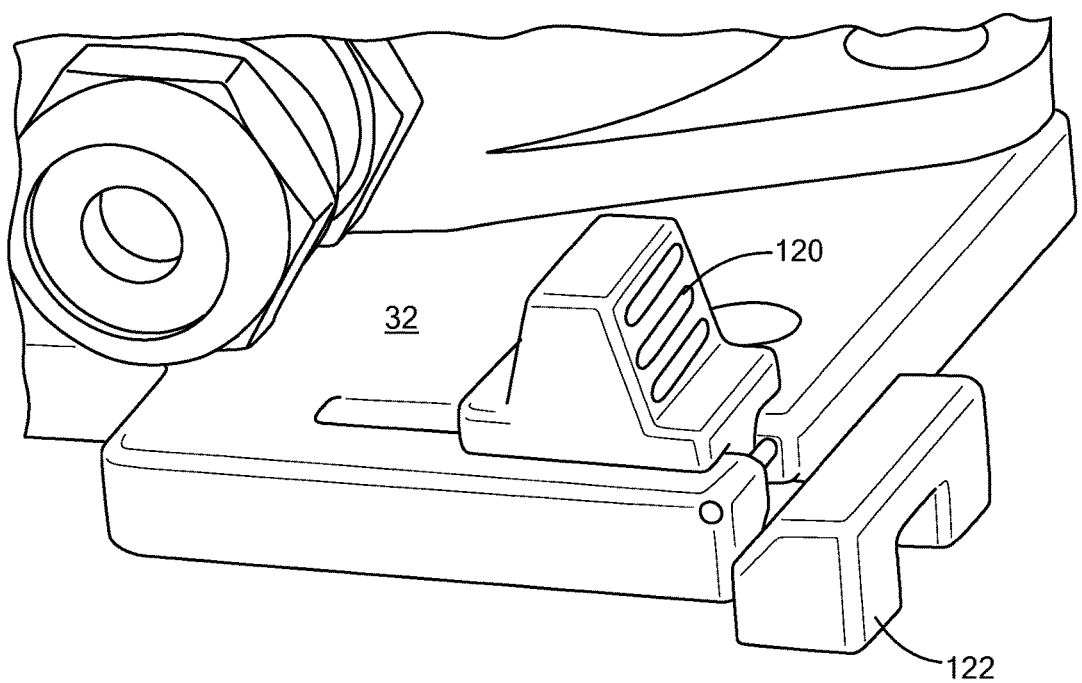

A spring loader slider 120, FIGS. 19-20 on member 32 can be used in connection with latch 122 on chassis 12 to releasably lock member 32 on top of chassis 12. Member 32 pivots about hinge 124 when released.

Figure 21:
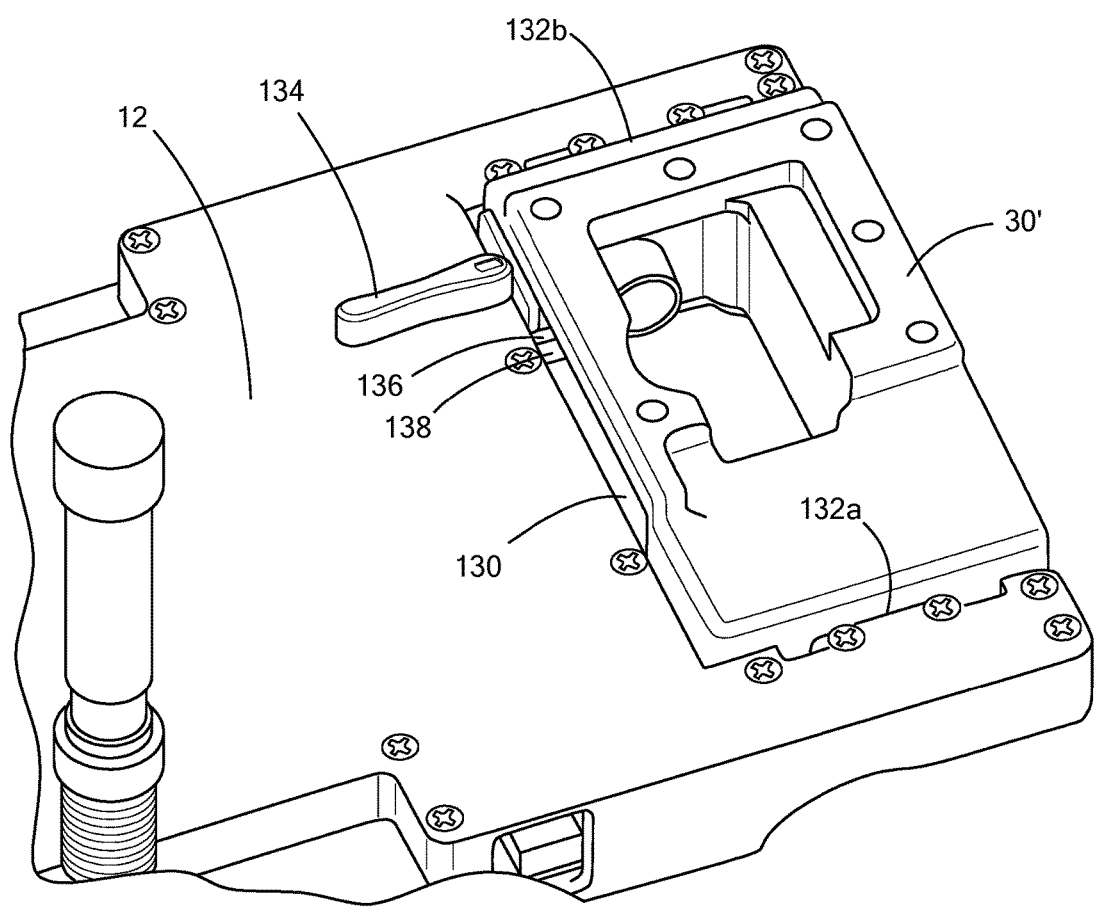
Figure 22:
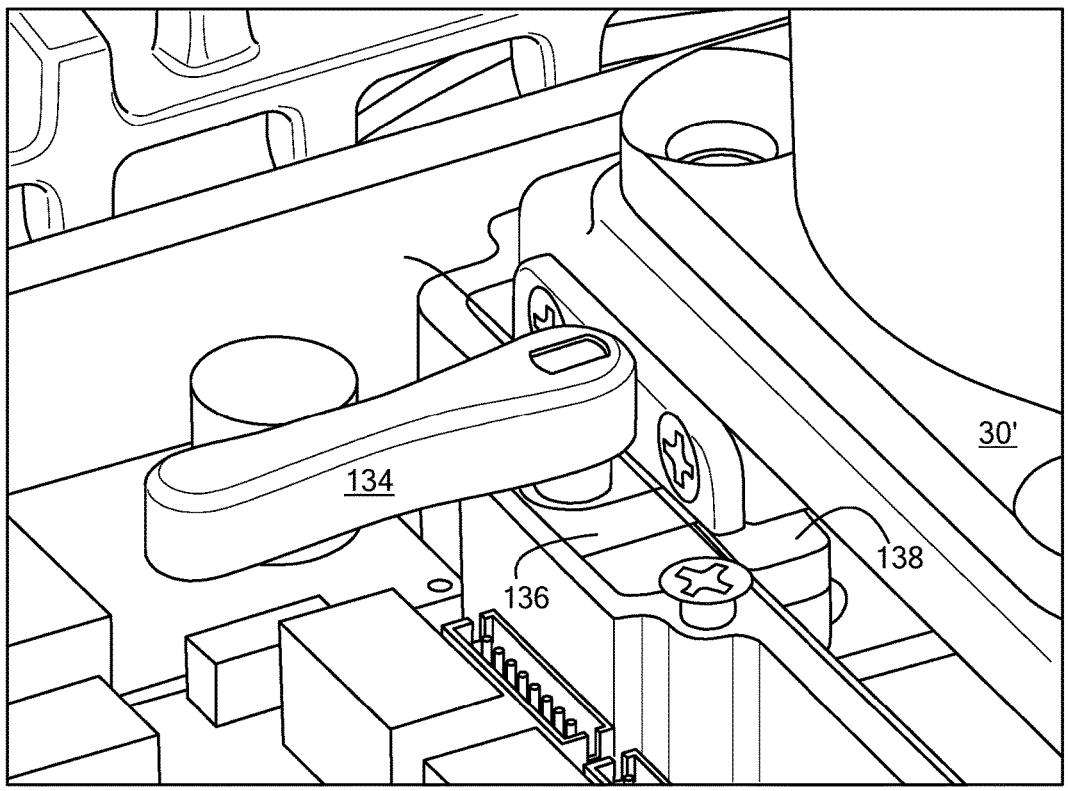
Figure 23:
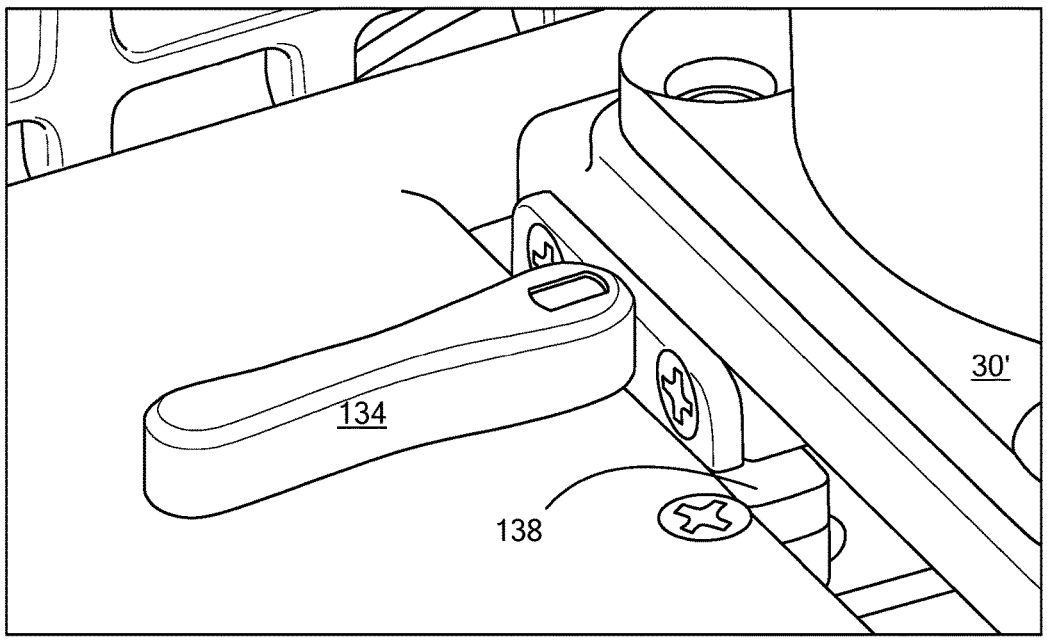
Figure 24:
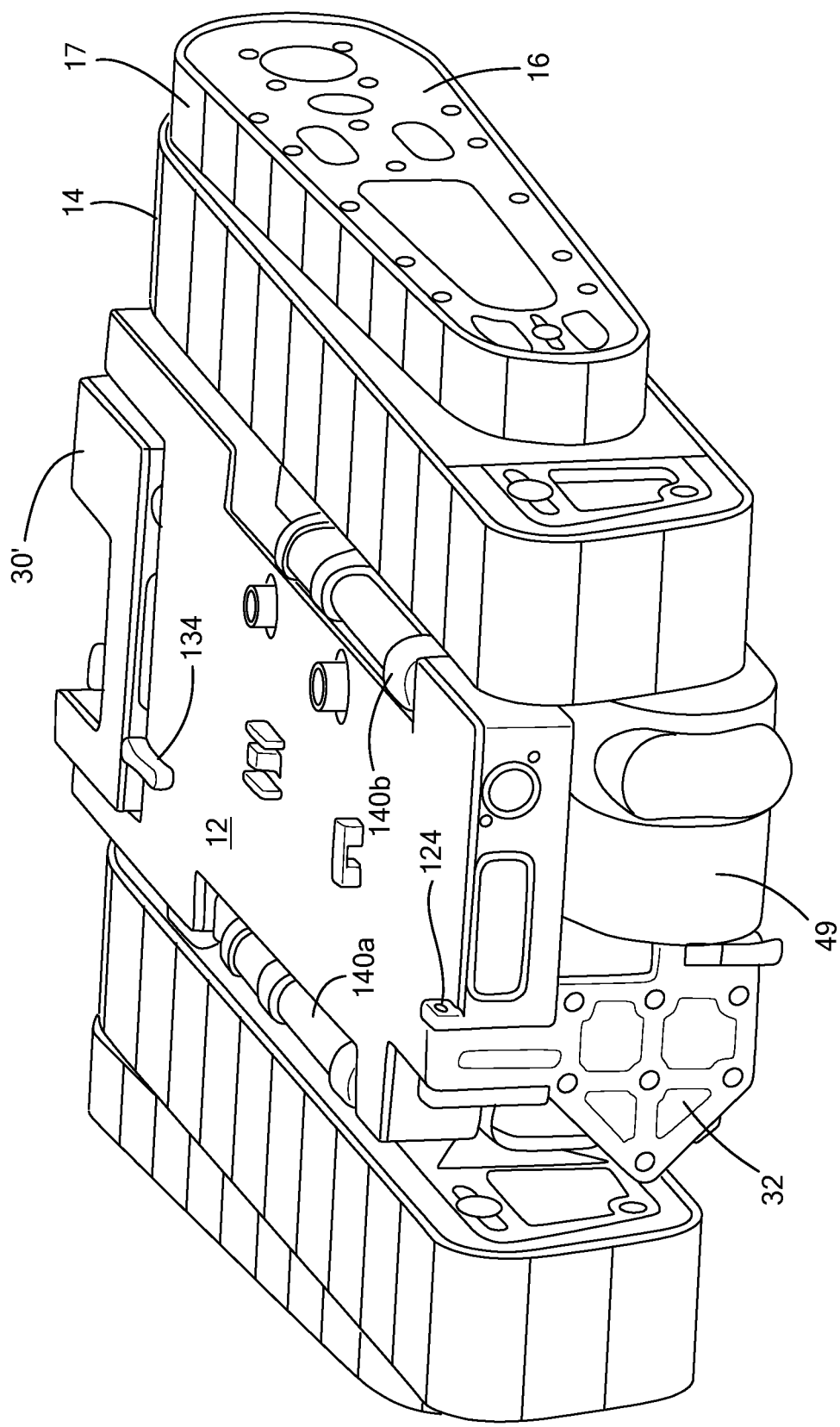
Figure 25:
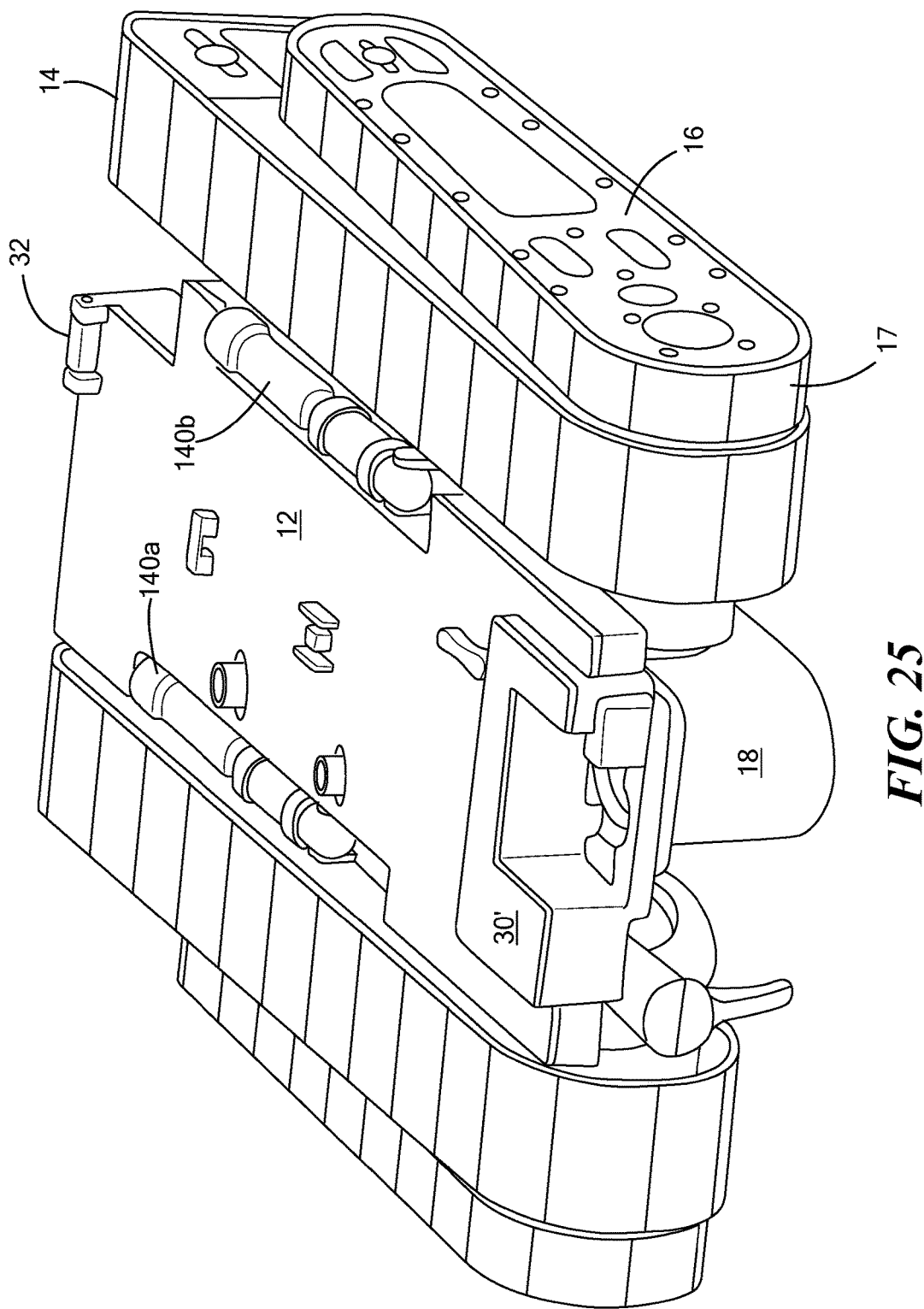
Figure 26:
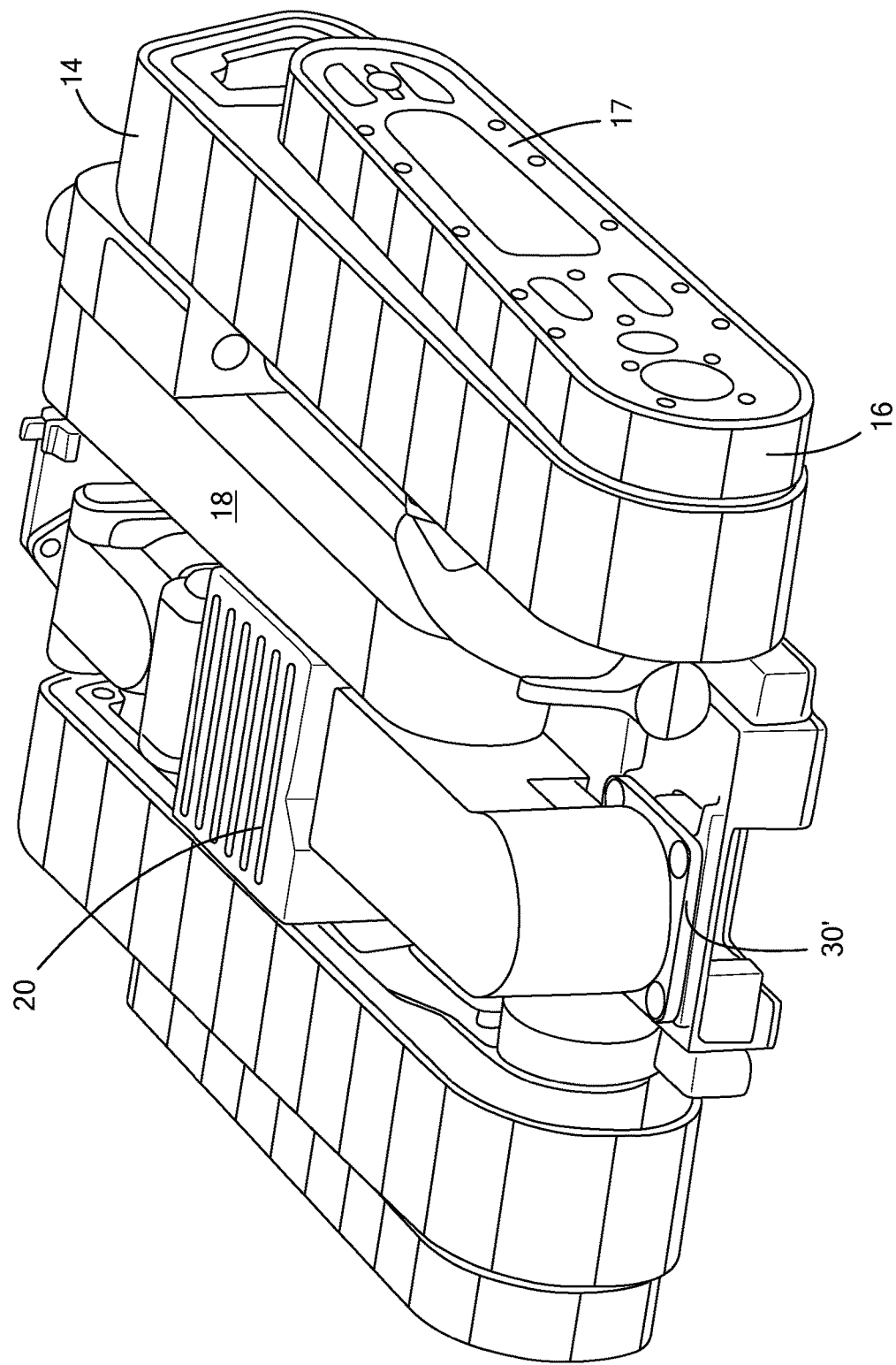
Figure 27:
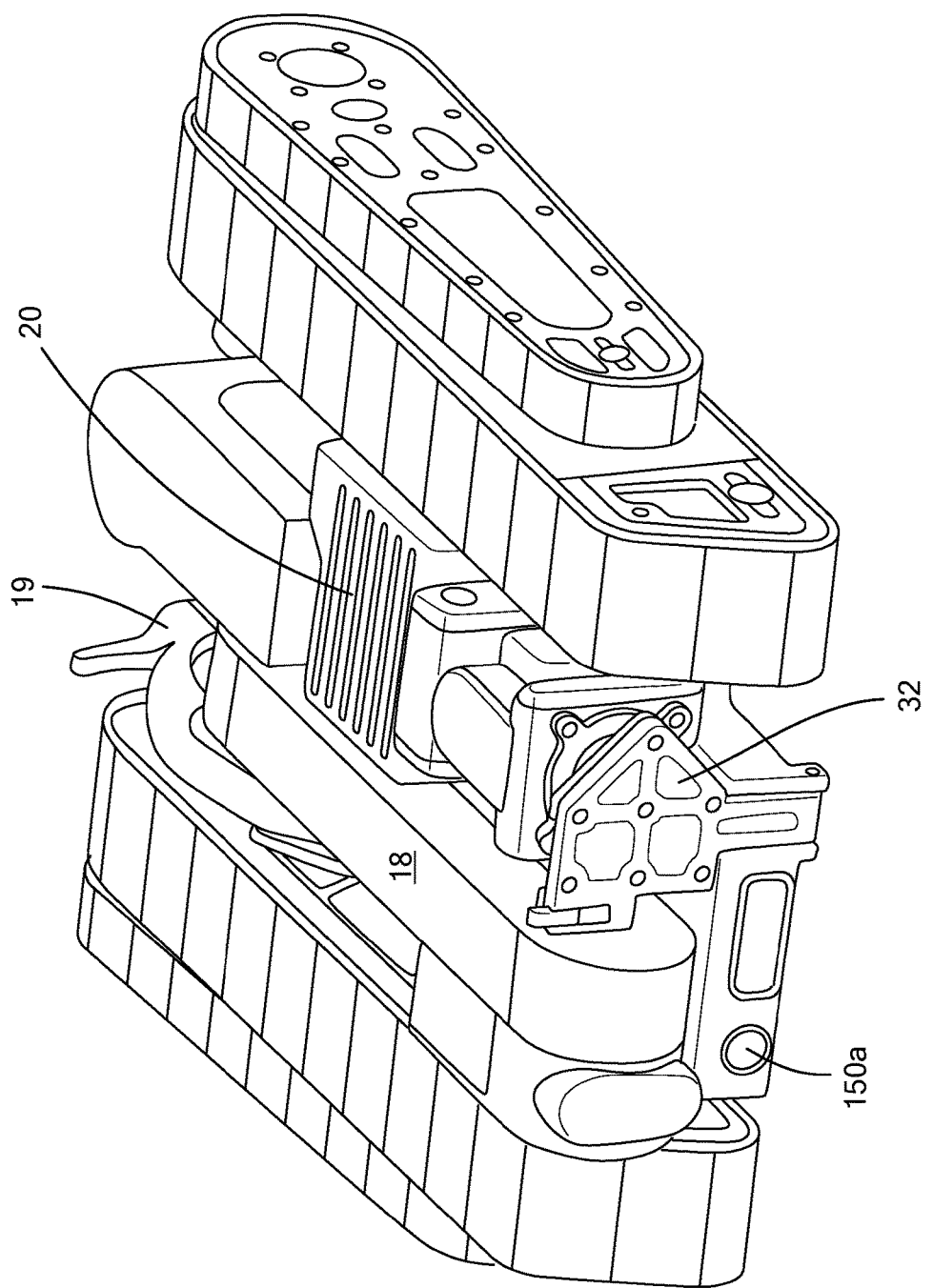

FIGS. 21-22 show member 30' to which the robot arm is attached. Member 30' resides in U-shape cut-out 130 in the end of chassis 12 and pivots about hinges 132a and 132b. Latch 134 may be used to secure folding base member 30' into the deployed position shown in FIG. 21 when latch bar 136 under chassis 12 rotates or otherwise is driven into slot 138 in the sidewall of member 30'. When the latch bar 136 is clear of slot 138 as shown in FIG. 23, member 30' can be rotated to store the robot arm under the chassis as shown in FIG. 24. See also FIGS. 24-27 which show spring loaded antennas 140a and 140b foldable relative to chassis 12 into sidewalls thereon.

Figure 28:
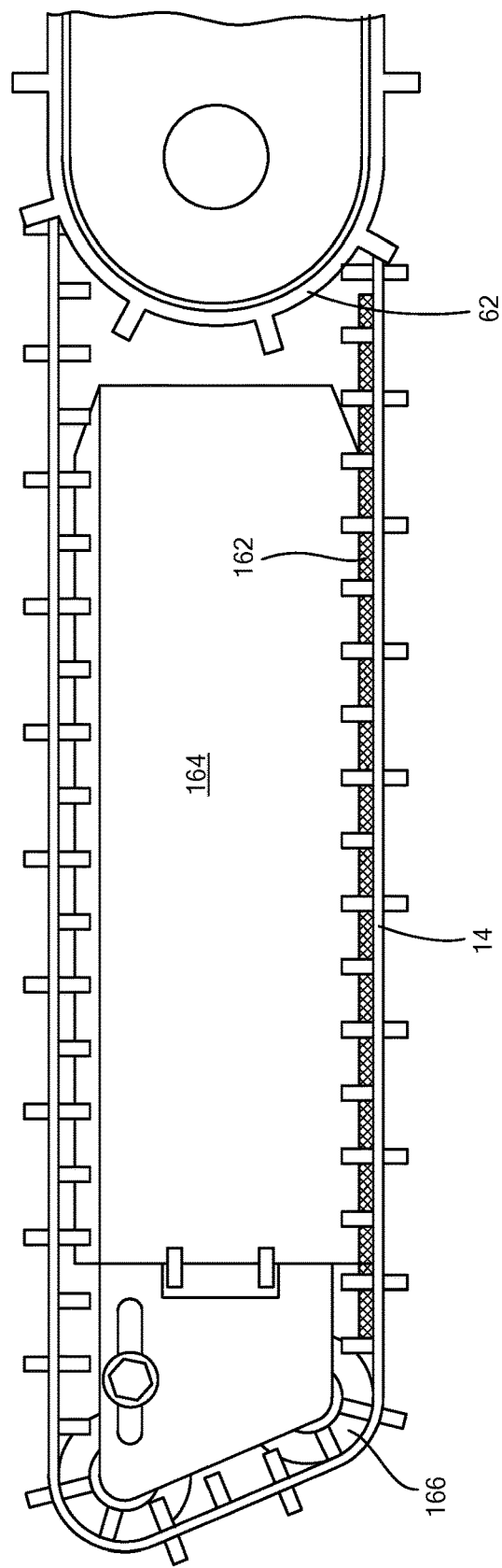
Figure 29:
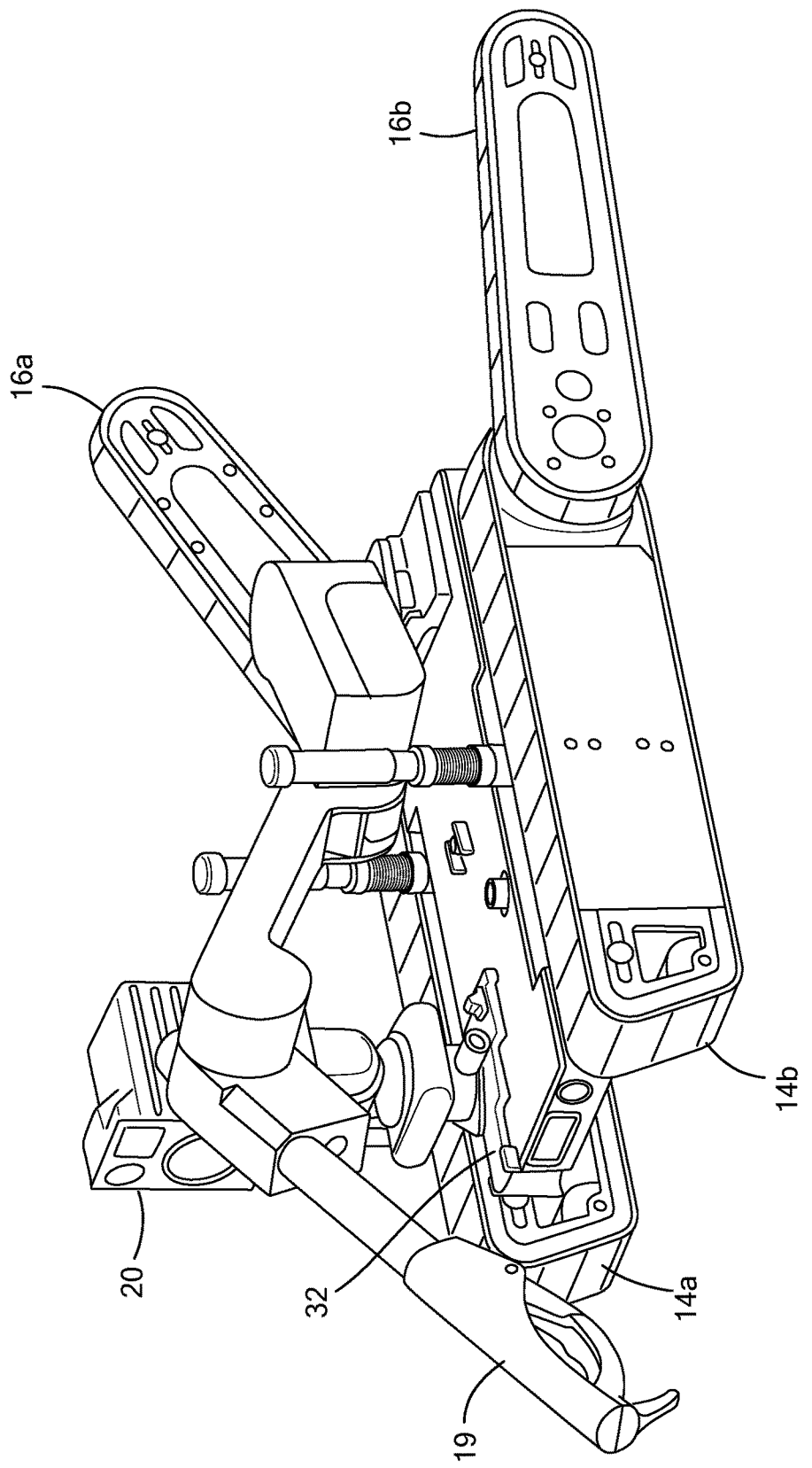

FIG. 28 shows skid plate 162 located between the sidepod 164 and the main track 14 and attached to the sidepod. The skid plate may be composed of a low friction plastic, preferably PTFE. The plate is thick enough so that the weight of the robot is born by the sidepod via the skid plate when the robot is on level ground. This configuration promotes quiet operation on flat ground. The skid plate extends beyond the sidepod, nearly touching both rotor 62 and guide roller 166. The extended length of the skid plate provides additional support of the track during stairclimbing, facilitating the motion of the robot on stairs. FIG. 29 shows independent movement of flippers 16a and 16b. The flippers may be controlled independently to facilitate maneuvering on uneven terrain.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A remotely controlled packable robot comprising:
   a chassis with a top surface and a bottom surface;
   a pair of main tracks for maneuvering the chassis;
   an open channel under the robot defined by the bottom surface of the chassis the main tracks;
   a robot arm foldable from a stored position in said open channel underneath the robot chassis to a deployed position extending upwards from the top surface of the chassis; and
   a camera assembly foldable from a stowed position in said open channel underneath the robot chassis next to said robot arm to a deployed position extending upwards from the top surface of the chassis; and
   a foldable base member for the robot arm located on one end of the chassis and a foldable base member for the camera assembly located on an opposite end of the chassis.

2. The robot of claim 1 in which the foldable base member for the robot arm includes a member hinged to the chassis.

3. The robot of claim 2 further including a latch mechanism for releasably retaining the foldable base member in the deployed position.

4. The robot of claim 2 in which the chassis includes a U-shaped cut-out therein and the foldable base member resides in the cut-out.

5. The robot of claim 1 further including a latch mechanism for releasably retaining the foldable base member for the camera in the deployed position.

6. The robot of claim 1 further including rotatable tracked flipper arms for maneuvering the chassis.

7. The robot of claim 6 further including an integrated drive assembly for each main track and flipper pair including:
   a motor in a housing for rotating the flipper, and
   a stator and rotor disposed about the housing for driving the main track and the flipper track.

8. The robot of claim 7 further including a slip clutch attached to a flipper arm and driven by said motor via a gear train.

9. The robot of claim 7 in which the stator is affixed about the housing and includes teeth with windings thereabout.

10. The robot of claim 7 in which the rotor rotates about the housing and includes magnets therein.

11. The robot of claim 10 in which the rotor includes exterior teeth driving a main track.

12. The robot of claim 10 further including a sprocket attached to the rotor driving a flipper track.

13. The robot of claim 1 further including a skid plate for each main track.

14. A remotely controlled packable robot comprising:
   a chassis with a top surface and a bottom surface;
   right and left main tracks for maneuvering the chassis;
   right and left tracked rotatable flipper arms for maneuvering the chassis;
   an integrated drive assembly for each main track and flipper pair including:
   a motor in a housing for rotating the flipper, and
   a stator and rotor disposed about the housing for driving the main track and the flipper track;

an open channel under the robot defined by the bottom surface of the chassis and the main tracks;

a robot arm foldable from a stored position in said open channel underneath the robot chassis to a deployed position extending upwards from the top surface of the chassis; and a camera assembly foldable from a stowed position in said open channel underneath the robot chassis next to said robot arm to a deployed position extending upwards from the top surface of the chassis.

15. The robot of claim 14 including a foldable base member for the robot arm located on one end of the chassis and a foldable base member for the camera assembly located on an opposite end of the chassis.

16. The robot of claim 15 in which the foldable base member for the robot arm includes a member hinged to the chassis.

17. The robot of claim 16 further including a latch mechanism for releasably retaining the foldable base member in the deployed position.

18. The robot of claim 16 in which the chassis includes a U-shaped cut-out therein and the foldable base member resides in the cut-out.

19. The robot of claim 15 further including a latch mechanism for releasably retaining the foldable base member for the camera in the deployed position.

20. The robot of claim 14 further including a slip clutch attached to a flipper arm and driven by said motor via a gear train.

21. The robot of claim 14 in which the stator is affixed about the housing and includes teeth with windings thereabout.

22. The robot of claim 14 in which the rotor rotates about the housing and includes magnets therein.

23. The robot of claim 22 in which the rotor includes exterior teeth driving a main track.

24. The robot of claim 21 further including a sprocket attached to the rotor driving a flipper track.

25. A remotely controlled packable robot comprising:
a chassis with a top surface and a bottom surface;
a pair of main tracks for maneuvering the chassis;
an open channel under the robot defined by the bottom surface of the chassis and the main tracks;
a member hinged to the chassis; and
a robot arm coupled to the member and foldable from a stored position in said open channel underneath the robot chassis to a deployed position extending upwards from the top surface of the chassis.

26. The robot of claim 25 further including a camera assembly foldable from a stowed position in said open channel underneath the robot chassis next to said robot arm to a deployed position extending upwards from the top surface of the chassis.

27. A remotely controlled packable robot comprising:
a chassis with a top surface and a bottom surface;
a pair of main tracks for maneuvering the chassis;
an open channel under the robot defined by the bottom surface of the chassis and the main tracks;
a member hinged to the chassis; and
a camera assembly coupled to the member and foldable from a stowed position in said open channel underneath the robot chassis to a deployed position extending upwards from the top surface of the chassis.

28. The robot of claim 27 further including a robot arm foldable from a stored position in said open channel underneath the robot chassis next to the camera assembly to a deployed position extending upwards from the top surface of the chassis.

29. A remotely controlled packable robot comprising:
a chassis with a top surface and a bottom surface;
a pair of main tracks for maneuvering the chassis;
an open channel under the robot defined by the bottom surface of the chassis and the main tracks;
a first pivotable base member for a robot arm located on one end of the chassis and a second pivotable base member for a camera assembly located on an opposite end of the chassis;
a robot arm mounted to the first pivotable base member and foldable from a stored position in said open channel underneath the robot chassis to a deployed position extending upwards from the top surface of the chassis; and
a camera assembly mounted to the second pivotable base member and foldable from a stowed position in said open channel underneath the robot chassis next to said robot arm to a deployed position extending upwards from the top surface of the chassis.

* * * * *